US012253428B2

(12) United States Patent
Wu et al.

(10) Patent No.: US 12,253,428 B2
(45) Date of Patent: Mar. 18, 2025

(54) SYSTEM AND METHOD FOR MEASURING SATELLITE GHOST EFFICIENCY OF DIFFRACTIVE LENS

(71) Applicant: Meta Platforms Technologies, LLC, Menlo Park, CA (US)

(72) Inventors: Yiyang Wu, Rochester, NY (US); Hsien-Hui Cheng, Woodinville, WA (US); Xuan Wang, Kirkland, WA (US); Lu Lu, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 173 days.

(21) Appl. No.: 18/086,638

(22) Filed: Dec. 21, 2022

(65) Prior Publication Data

US 2024/0210272 A1     Jun. 27, 2024

(51) Int. Cl.
*G01M 11/02*     (2006.01)
(52) U.S. Cl.
CPC .............................. *G01M 11/0207* (2013.01)
(58) Field of Classification Search
CPC ......... G01M 11/0207; G01M 11/0257; G01M 11/0285
USPC .......................................................... 356/124
See application file for complete search history.

(56) References Cited

U.S. PATENT DOCUMENTS

| | | | |
|---|---|---|---|
| 9,915,850 | B2 | 3/2018 | Bitauld et al. |
| 10,534,121 | B2 | 1/2020 | Hiraoka et al. |
| 2014/0252228 | A1* | 9/2014 | McMorran ............ H01J 37/263 250/311 |
| 2023/0258870 | A1* | 8/2023 | Sappey ................ G01N 21/255 356/409 |

OTHER PUBLICATIONS

Asundi A., et al., "Optical Strain Sensor using Position-Sensitive Detector and Diffraction Grating: Error Analysis," Optical Engineering, vol. 39, No. 6, Jun. 2000, pp. 1645-1651.
Mahecic D., et al., "Homogeneous Multifocal Excitation for High-Throughput Super-Resolution Imaging," Nature Methods, vol. 17, Jul. 26, 2020, 24 pages.
Roundy C. B., "Current Technology of Laser Beam Profile Measurements," Ophir-Spiricon Inc., 1999, 44 pages.

* cited by examiner

*Primary Examiner* — Md M Rahman
(74) *Attorney, Agent, or Firm* — MILLBURN IP PLLC

(57) ABSTRACT

A system for measuring a satellite ghost efficiency of a diffractive lens is provided. The system includes a light source configured to output a first probing beam, and a beam tweaking assembly disposed between the light source and the diffractive lens, and configured to convert the first probing beam into a second probing beam that is a non-collimated beam. The diffractive lens diffracts the second probing beam into a plurality of diffracted beams including a first diffracted beam of a parent diffraction order and a second diffracted beam of a satellite ghost diffraction order. The beam tweaking assembly includes one or more optical lenses, and an adjustable optical power. The system also includes a detector configured to generate a beam spot pattern including a first beam spot corresponding to the first diffracted beam and a second beam spot corresponding to the second diffracted beam.

20 Claims, 13 Drawing Sheets

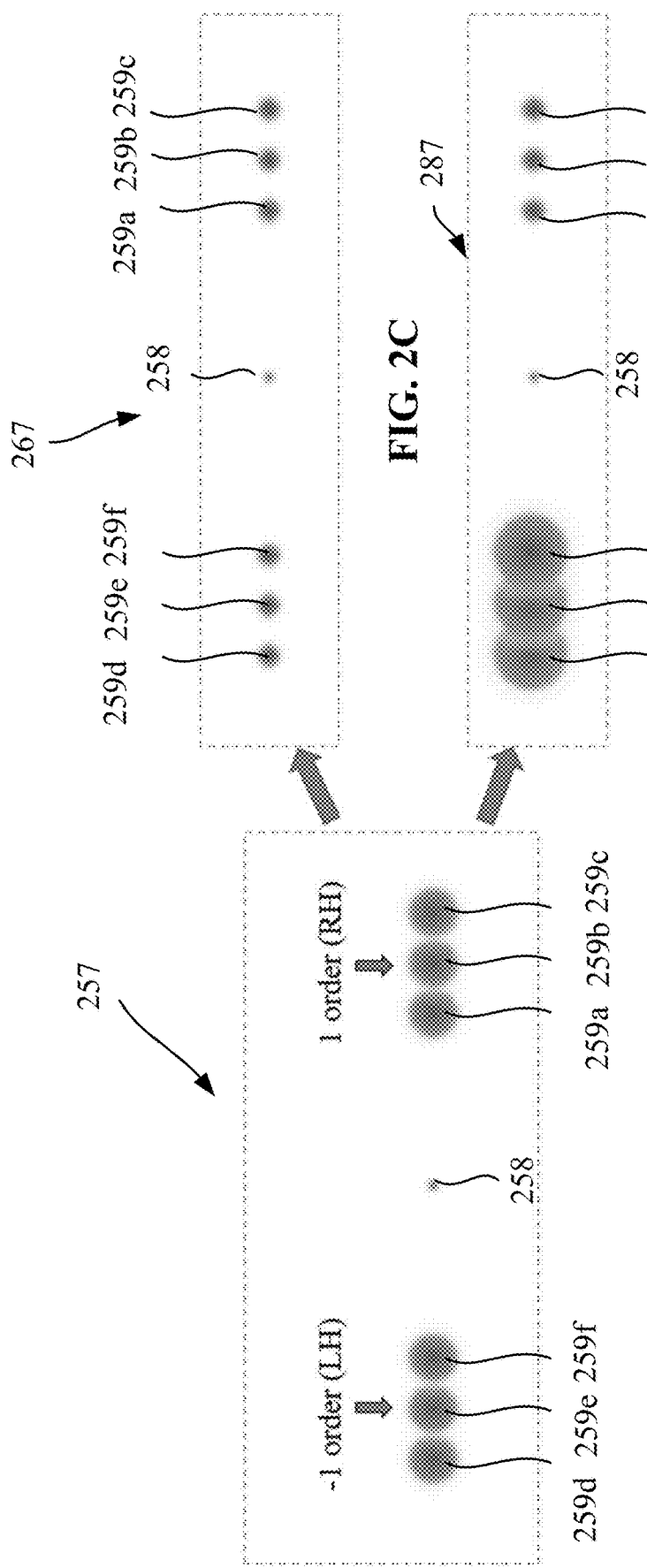

500

510 — Outputting, by a light source, a first probing beam to a beam tweaking assembly disposed between the light source and a diffractive lens, the beam tweaking assembly including one or more optical lenses, and an optical power of the beam tweaking assembly being adjustable 520 — Converting, by the beam tweaking assembly, the first probing beam into a second probing beam propagating toward the diffractive lens, the second probing beam being a non-collimated beam, the diffractive lens diffracting the second probing beam into a plurality of diffracted beams including a first diffracted beam of a parent diffraction order and a second diffracted beam of a satellite ghost diffraction order 530 — Generating, by a detector, a beam spot pattern including a first beam spot corresponding to the first diffracted beam and a second beam spot corresponding to the second diffracted beam 540 — Controlling, by a controller, the beam tweaking assembly to adjust a beam spot size of each of the first beam spot and the second beam spot and a separation distance between the first beam spot and the second beam spot until the beam spot size of each of the first beam spot and the second beam spot is smaller than a first predetermined value, and the separation distance is greater than a second predetermined value

FIG. 5

SYSTEM AND METHOD FOR MEASURING SATELLITE GHOST EFFICIENCY OF DIFFRACTIVE LENS

TECHNICAL FIELD

The present disclosure generally relates to optical systems and methods and, more specifically, to a system and a method for measuring satellite ghost efficiency of a diffractive lens.

BACKGROUND

Diffractive optical elements ("DOEs") are thin phase elements that operate by means of interference and diffraction to produce desirable distributions of light. Diffractive lenses are members of the DOE family. Diffractive lenses may converge or diverge an incident beam in addition to diffracting the incident beam into several beams propagating in different directions (i.e., different diffraction angles). Diffractive lenses include ruled diffractive lenses, holographic diffractive lenses, Fresnel lenses, liquid crystal diffractive lenses, meta material or metasurface lenses, Pancharatnam-Berry phase ("PBP") lenses, polarization volume hologram ("PVH") lenses, diffractive lenses based on surface relief structures, diffractive lenses based on volume Bragg grating ("VBG"), etc. Diffractive lenses provide apertures and focal lengths comparable to conventional lenses having continuous curved surfaces, with a smaller thickness and a light weight. Thus, diffractive lenses are cost-effective, light-weight alternative to conventional lenses.

SUMMARY OF THE DISCLOSURE

Consistent with an aspect of the present disclosure, a system for measuring a satellite ghost efficiency of a diffractive lens is provided. The system includes a light source configured to output a first probing beam, and a beam tweaking assembly disposed between the light source and the diffractive lens, and configured to convert the first probing beam into a second probing beam that is a non-collimated beam. The diffractive lens diffracts the second probing beam into a plurality of diffracted beams including a first diffracted beam of a parent diffraction order and a second diffracted beam of a satellite ghost diffraction order. The beam tweaking assembly includes one or more optical lenses, and an optical power of the beam tweaking assembly is adjustable. The system also includes a detector configured to generate a beam spot pattern including a first beam spot corresponding to the first diffracted beam and a second beam spot corresponding to the second diffracted beam.

Consistent with another aspect of the present disclosure, a method for measuring a satellite ghost efficiency of a diffractive lens is provided. The method includes outputting, by a light source, a first probing beam to a beam tweaking assembly disposed between the light source and the diffractive lens, the beam tweaking assembly including one or more optical lenses, and an optical power of the beam tweaking assembly being adjustable. The method also includes converting, by the beam tweaking assembly, the first probing beam into a second probing beam propagating toward the diffractive lens, the second probing beam being a non-collimated beam, the diffractive lens diffracting the second probing beam into a plurality of diffracted beams including a first diffracted beam of a parent diffraction order and a second diffracted beam of a satellite ghost diffraction order. The method further includes generating, by a detector, a beam spot pattern including a first beam spot corresponding to the first diffracted beam and a second beam spot corresponding to the second diffracted beam.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIGS. 2B-2D illustrate various beam spot patterns formed at a measurement plane, by beams diffracted by a diffractive lens when a beam tweaking assembly included in the system shown in FIG. 2A is controlled to provide various optical powers, according to various embodiments of the present disclosure;

FIG. 5 is a flowchart illustrating a method for measuring satellite ghost efficiency of a diffractive lens, according to an embodiment of the present disclosure;

DETAILED DESCRIPTION

Figure 1A:
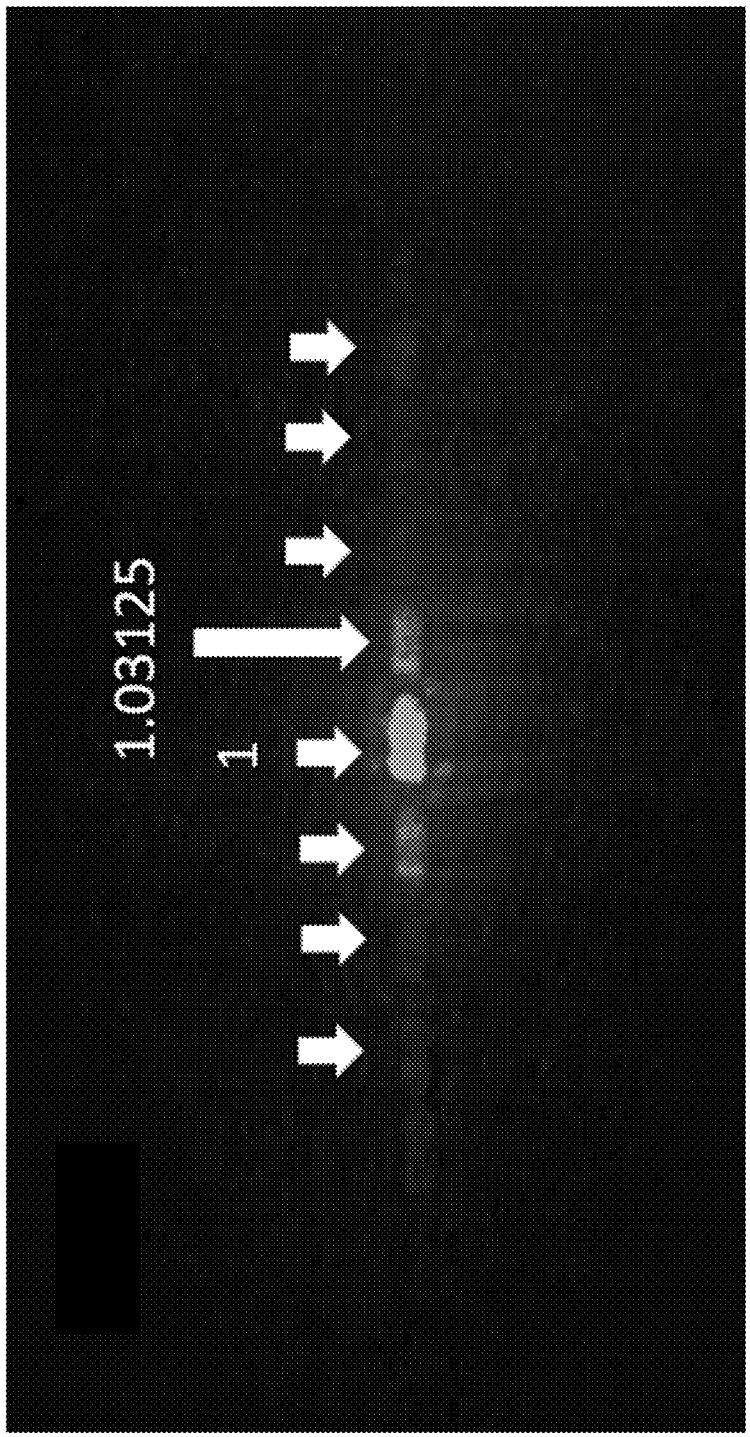
FIG. 1A illustrates type I satellite ghost diffraction orders of a diffractive lens, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The term "film plane" refers to a plane in the film, layer, coating, or plate that is perpendicular to the thickness direction. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane. For example, an "in-plane" direction or orientation may refer to a direction or orientation within a surface plane, an "out-of-plane" direction or orientation may refer to a thickness direction or orientation non-parallel with (e.g., perpendicular to) the surface plane.

The term "orthogonal" as in "orthogonal polarizations" or the term "orthogonally" as in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

The term "substantially" or "primarily" used to modify an optical response action, such as transmit, reflect, diffract, block or the like that describes processing of a light means that a majority portion, including all, of a light is transmitted, reflected, diffracted, or blocked, etc. The majority portion may be a predetermined percentage (greater than 50%) of the entire light, such as 100%, 98%, 90%, 85%, 80%, etc., which may be determined based on specific application needs.

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof.

An "optical power" of a light beam means the delivered energy per unit time in a light beam, for example a laser beam. An "optical power" of an optical element/device/system means the degree to which the optical element/device/system converges or diverges a light beam. The optical element/device/system may include a lens, or a plurality of lenses arranged in an optical series, etc.

Beam diameter or beam width of a beam is the dimension (e.g., diameter, width) along a specified line that is perpendicular to the beam axis and that intersects the beam axis. Since beams typically do not have sharp edges, the beam diameter or beam width of a beam can be defined in various ways. Five definitions of the beam diameter or beam width are in common use: D4σ, 10/90 or 20/80 knife-edge, $1/e^2$, full width at half maximum ("FWHM"), and D86. The beam diameter or beam width of a beam may be measured in units of length at a cross-sectional plane perpendicular to the beam axis. Beam diameter is usually used in applications where the beam has a circular cross section (or a circular beam spot) at a cross-sectional plane perpendicular to the beam axis. Beam width is usually used in applications where the beam does not have circular symmetry. When a beam has an elliptical cross section, the orientation of the beam diameter or beam width may be specified with respect to the major or minor axis of the elliptical cross section. Beam angular width is the angle subtended by the beam at a source, which is also referred to as beam divergence. For illustrative and discussion purposes, the beam described herein is presumed to have a circular cross section with a beam diameter.

Diffractive optical elements ("DOEs") exhibit both parent diffraction orders and satellite ghost diffraction orders (hereafter referred to as satellites or satellite ghosts). There are two types of satellites: type I satellites are diffraction orders that are multiples (e.g., 1×, 2×, 3×, etc.) of specific orders, and type II satellites are diffraction orders that are not multiples of specific orders. Type I satellites are often observed in most, if not all, diffractive optical elements ("DOEs"), and are accountable for bright ghost images (e.g., having 1-15% energy of an incident beam). Type I satellites are similar to the Rawland ghosts in historical literature. A Rawland ghost is a false spectral line produced by a diffraction grating, arising from periodic errors in the groove position. Type II satellites are rarely observed but do exist in certain circumstances (e.g., having 1-2% energy of an incident beam). Type II satellites are similar to the Lyman ghosts in historical literature. A Lyman ghost is a false line observed in a spectroscope as a result of a combination of periodicities in the ruling. The satellites have a long history dating back to 1893. Although nowadays people use new technologies (e.g., liquid crystals) for DOEs, whereas in the old days people used blazed gratings from optical ruling engines, the physics of satellites are substantially the same.

FIG. 1A illustrates type I satellite ghost diffraction orders of a diffractive lens (e.g., PBP lens), according to an embodiment of the present disclosure. FIG. 1A shows a beam spot of a beam of the $+1^{st}$ diffraction order (which is a parent diffraction order), and beam spots of beams of a series of satellite ghost diffraction orders. The beam spots corresponding to the satellite ghost diffraction orders are distributed at both sides of the beam spot corresponding to the parent diffraction order. Type I satellite ghost diffraction orders are dominating satellite ghosts, which may be classified according to a parent diffraction order and may have logical spatial distances ½, ¼, ⅛, etc., of a certain spatial distance) with respect to the parent diffraction order. Type I satellite ghosts resemble the Rawland ghosts in historical literature.

Figure 1B:
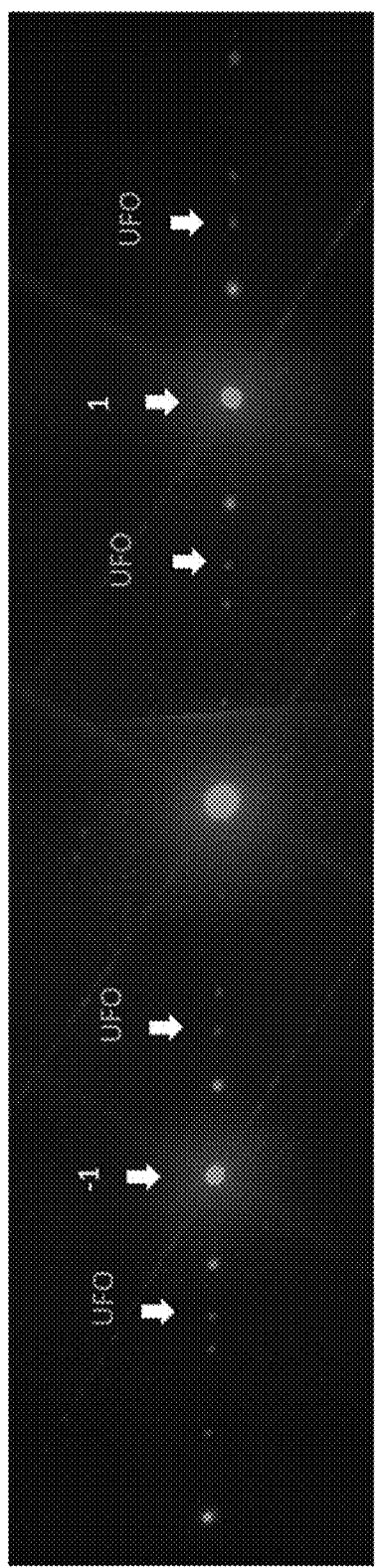
FIG. 1B illustrates type I satellite ghost diffraction orders of a diffractive lens, according to an embodiment of the present disclosure.

FIG. 1B illustrates type II satellite ghost diffraction orders of a diffractive lens (e.g., a PBP lens), according to an embodiment of the present disclosure. FIG. 1B shows a beam spot of a beam of the $+1^{st}$ diffraction order (which is a parent diffraction order), a beam spot of a beam of the $-1^{st}$ diffraction order (which is another parent diffraction order). Surrounding each parent diffraction order are beam spots of beams of a series of satellite ghost diffraction orders (labelled as "UFO"). Type II satellite ghost diffraction orders do not have the logical spatial distances, and are not classified according to neighboring diffraction orders. Type II satellite ghost diffraction orders are rarely observed, and often have low energy efficiency. Type II satellite ghost diffraction orders resemble the Lyman ghosts.

When a diffractive lens is implemented in an optical device or optical system, the satellite ghosts with sufficiently high energy (e.g., type I satellite ghosts) may cause bright ghost images, degrading the performance of the optical system. Thus, it is desirable to measure or determine the diffraction efficiency of the satellite ghosts of a diffractive lens in relevant spectral ranges, in order to keep the satellite ghost efficiency of the diffractive lens within a predetermined range, such that the diffractive lens satisfies design specifications.

Diffraction efficiency is the performance of DOEs in terms of optical power throughput. When an incident beam is diffracted by a DOE as a diffracted beam (or a beam of a diffraction order), the diffraction efficiency may be defined as a ratio between an optical power of the diffracted beam output from the DOE and an optical power of the incident beam, i.e., Po/Pi, where $P_o$ is the optical power of the diffracted beam output from the DOE and Pi is the optical power of the incident beam. The optical power of a light beam may be measured by a dedicated optical power meter, or may be measured from signals acquired by a detector configured to detect a beam.

Figure 1C:
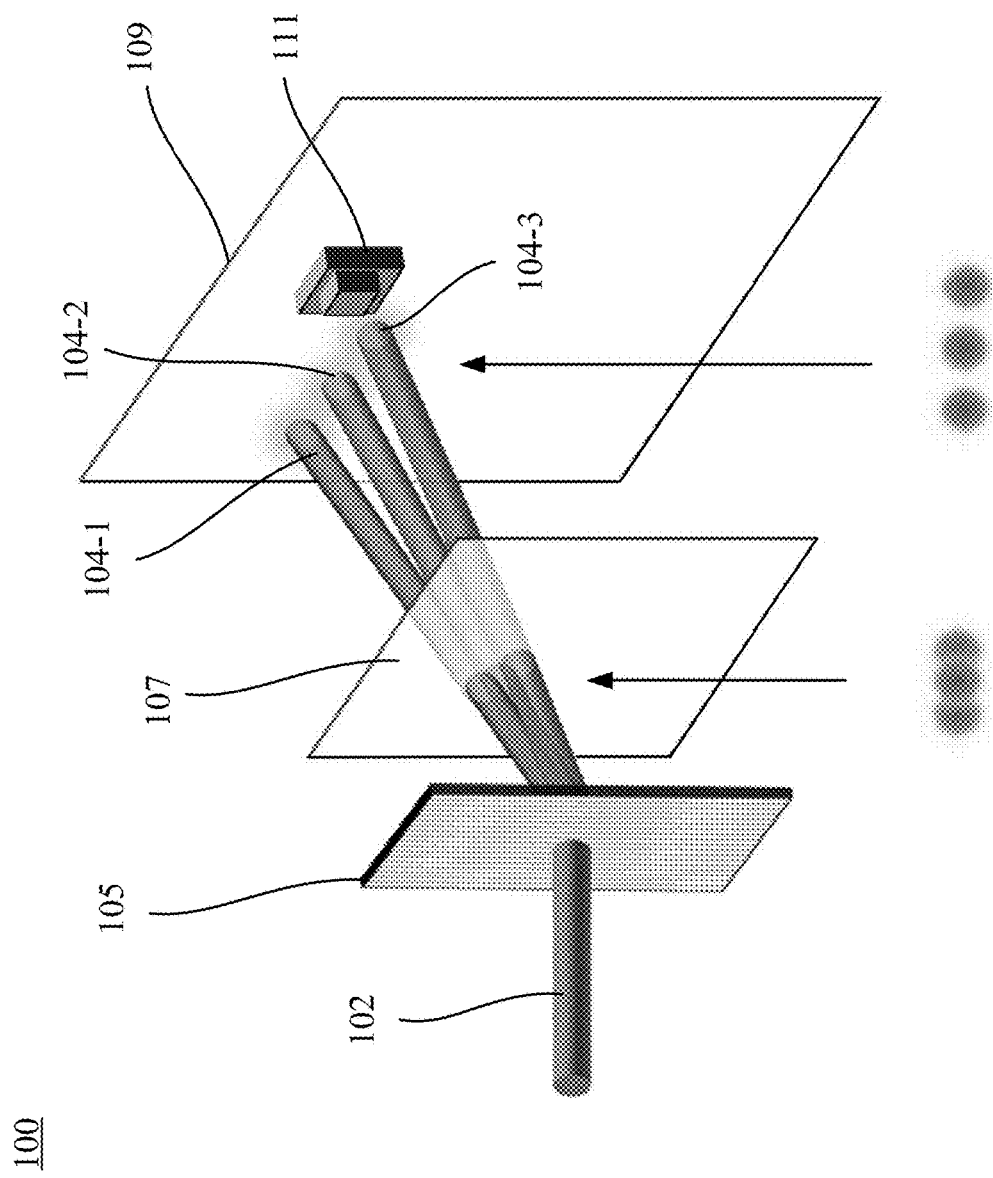
FIG. 1C illustrates a schematic diagram of a conventional system for measuring diffraction efficiency of a diffraction grating using a collimated probing beam and a detector.

FIG. 1C illustrates a schematic diagram of a conventional system 100 for measuring diffraction efficiency of a diffraction grating 105. The grating 105 is designed and fabricated for a collimated beam. For example, the grating 105 diffracts a substantially collimated incident beam at the maximum diffraction efficiency, with the minimum aberration and blur. As shown in FIG. 1C, the grating 105 is disposed between a light source (not shown) and a detector 111. A collimated probing beam 102 output from the light source propagates toward the grating 105. The grating 105 diffracts the collimated probing beam 102 as a plurality of beams 104-1, 104-2, and 104-3 propagating in different directions (e.g., different diffraction angles) toward the detector 111. The collimated beam 102 has a wavelength that is substantially the same as the design wavelength of the grating 105. An active light receiving area of the detector 111 has a circular cross section, and the collimated probing beam 102 has a beam diameter that is smaller than a size (e.g., a diameter or a width) of the active light receiving area of the detector 111.

The grating 105 provides zero optical power to the collimated probing beam 102. Thus, the diffracted beams 104-1, 104-2, and 104-3 are still substantially collimated, and the separation between the adjacent diffracted beams may gradually increase as the diffracted beams 104-1, 104-2, and 104-3 propagate in the space. For example, FIG. 1C shows that at a near measurement plane 107 that is close to the grating 105, the beam spots of the adjacent diffracted beams 104-1, 104-2, and 104-3 overlap with one another, in which case the optical powers of the beams cannot be separately measured. Thus, the diffraction efficiency of the grating 105 for different diffraction orders cannot be calculated. For the grating 105 having zero optical power, this issue can be solved by increasing the distance from the measurement plane to the grating 105. For example, as shown in FIG. 1C, at a far measurement plane 109 that is farther away from the grating 105 than the near measurement plane 107, the beam spots of the adjacent diffracted beams 104-1, 104-2, and 104-3 are sufficiently separated from one another, such that the detector 111 arranged at the far measurement plane 109 may separately and individually identify the beam spot of each diffracted beam 104-1, 104-2, or 104-3, and obtain the corresponding optical power of each diffracted beam 104-1, 104-2, or 104-3.

Based on the optical power of the probing beam 102 and the optical power of each diffracted beam 104-1, 104-2, or 104-3, the diffraction efficiency of the grating 105 for each diffraction order is calculated by dividing the optical power of the diffracted beam (104-1, 104-2, or 104-3) by the optical power of the probing beam 102. When the diffracted beams 104-1, 104-2, and 104-3 includes a beam of a parent diffraction order and one or more beams of one or more satellite ghost diffraction orders, the diffraction efficiency relating to each of the one or more satellite ghost diffraction orders is determined by dividing the optical power of the diffracted beam corresponding to each satellite ghost diffraction order by the optical power of the probing beam 102 that is incident onto the grating 105.

Unlike the grating 105 shown in the conventional system 100 of FIG. 1C that has zero optical power, a diffractive lens is a diffraction grating with a non-zero optical power, which may converge or diverge a beam while diffracting the beam. Due to the non-zero optical power provided by the diffractive lens to an incident beam, the diffracted beams associated with the parent diffraction order and the one or more satellite ghost diffraction orders may be smudged together, such that the diffraction orders cannot be separated by increasing the distance from the measurement plane to the grating 105 alone.

Figure 1D:
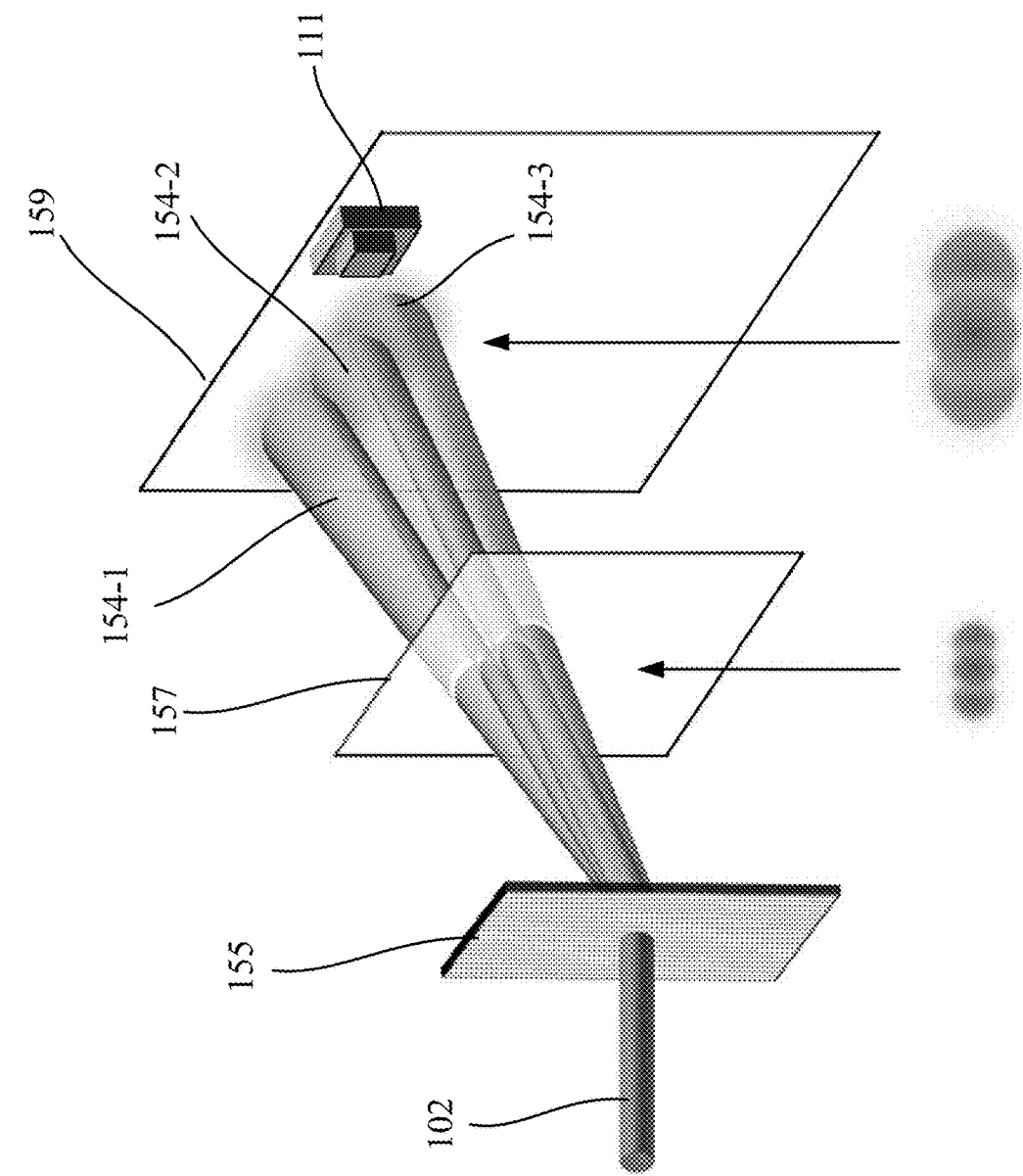
FIG. 1D illustrates measurement of a diffraction efficiency of a diffractive lens using the conventional system shown in FIG. 1C.

FIG. 1D illustrates measurement of the diffraction efficiency of a diffractive lens 155 using the conventional system 100 shown in FIG. 1C. The diffractive lens 155 is designed and fabricated for a collimated beam. That is, the diffractive lens 155 may diffract and converge or diverge a substantially collimated incident beam at the maximum diffraction efficiency, with the minimum aberration and blur. As shown in FIG. 1D, the collimated probing beam 102 is directed to the diffractive lens 155. The diffractive lens 155 diffracts the probing beam 102 as a plurality of beams 154-1, 154-2, and 154-3 of different orders propagating in different directions (e.g., different diffraction angles). Due to the non-zero optical power, the diffractive lens 155 may converge or diverge the probing beam 102 while diffracting the probing beam 102, thereby modulating the planar wavefront of the collimated probing beam 102 into a non-planar wavefront (e.g., a spherical wavefront) of the diffracted beam 154-1, 154-2, or 154-3. For example, FIG. 1D shows that the diffractive lens 155 diverges and diffracts the probing beam 102, and the diffracted beams 154-1, 154-2, and 154-3 are divergent beams (i.e., non-collimated beams) instead of collimated beams. FIG. 1D shows that the beam spots of adjacent diffracted beams 154-1, 154-2, and 154-3 overlap with one another at both a near measurement plane 157 and a far measurement plane 159. That is, increasing the distance from the measurement plane to the diffractive lens 155 alone does not separate the diffraction orders, and hence the diffraction efficiency for the diffraction orders cannot be calculated.

When the diffracted beams 154-1, 154-2, and 154-3 include beams of both a parent diffraction order and a satellite ghost diffraction order, the beam of the satellite ghost diffraction order may smudge (or overlap) with the beam of the parent diffraction order, and this overlapping issue cannot be addressed by increasing the distance from the measurement plane to the diffractive lens 155 alone. For example, in some cases, at the far measurement plane 159, the size of each beam spot may be larger than the size of an active light receiving area of a detection unit of the detector 111, and, thus, the active light receiving area of the detector 111 may receive only a portion of a single beam spot rather than the entire single beam spot. In some cases, at the far measurement plane 159, the size of each beam spot may be smaller than the size of the active light receiving area of the detector 111. However, as the overlapping beam spots are not sufficiently separated from one another, the active light receiving area of the detector 111 may receive portions of two overlapping beam spots. As the overlapping beam spots corresponding to the beams 154-1, 154-2, and 154-3 cannot be sufficiently separated, the optical power of each beam 154-1, 154-2, and 154-3 cannot be determined or measured separately and individually. Therefore, the satellite ghost efficiency of the diffractive lens 155 corresponding to each of the one or more satellite ghost diffraction orders cannot be determined by the conventional system 100.

The present disclosure provides systems and methods for determining (e.g., measuring or calculating) the satellite ghost efficiency of diffractive lenses based on a beam tweaking technique. The disclosed system and method for measuring the satellite ghost efficiency are featured with low cost, high detection sensitivity, high detection efficiency, and high detection accuracy. The disclosed system and method may be adopted in quality control process of mass production of diffractive lenses.

Figure 2A:
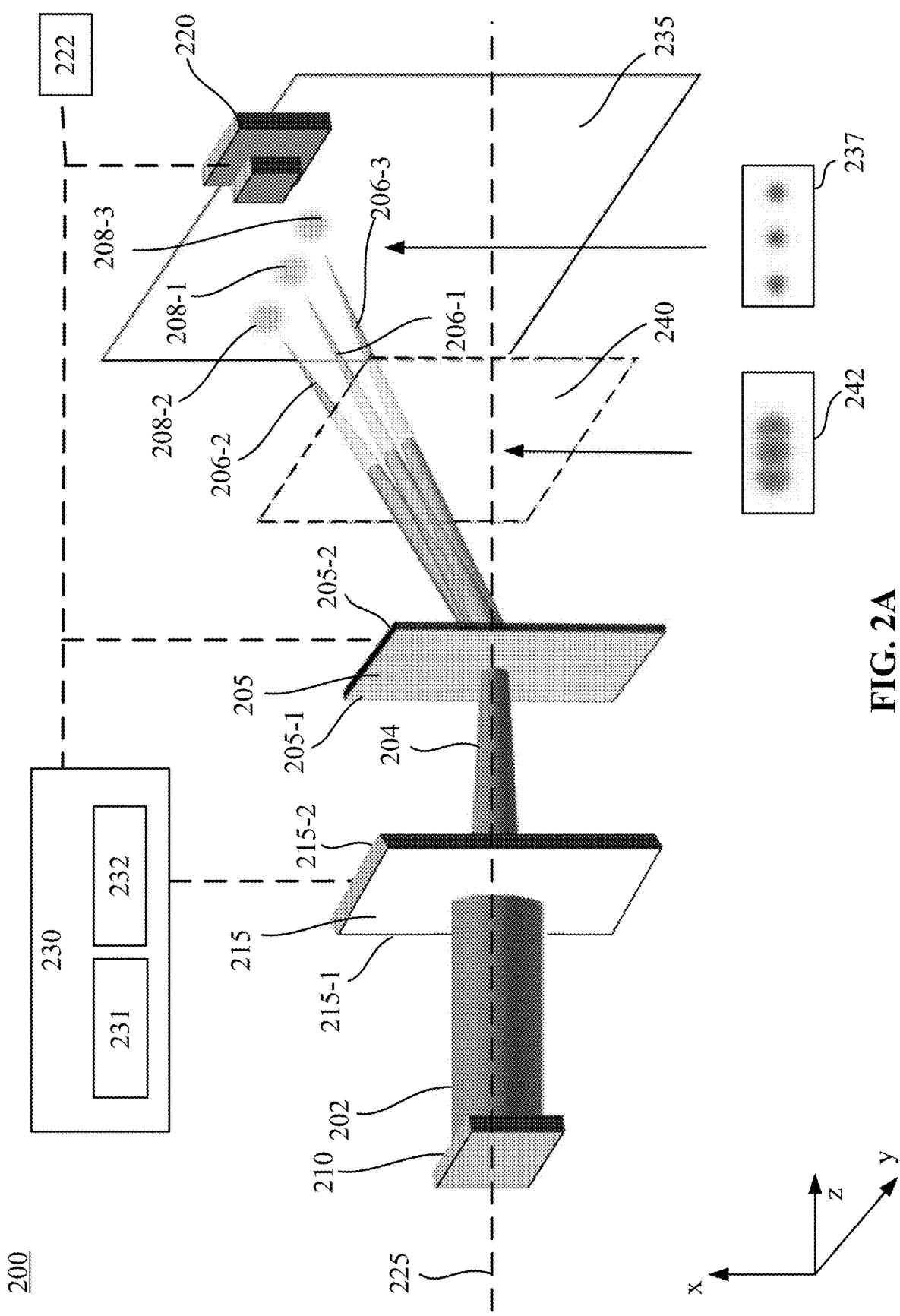
FIG. 2A illustrates a schematic diagram of a system for measuring satellite ghost efficiency of a diffractive lens, according to an embodiment of the present disclosure.

FIG. 2A illustrates a schematic diagram of a system 200 for measuring satellite ghost efficiency of a sample diffractive lens 205, according to an embodiment of the present disclosure. The sample diffractive lens 205 is a sample to be tested for the satellite ghost efficiency. As shown in FIG. 2A, the system 200 may include a light source 210, a beam tweaking assembly 215, a detector 220, and a controller 230. The system 200 may include additional elements that are not shown in FIG. 2A. The sample diffractive lens 205 (also referred to as the diffractive lens 205 for convenience of description) may be disposed between the beam tweaking assembly 215 and the detector 220. The diffractive lens 205 may be designed and fabricated for a collimated incident beam. For example, the diffractive lens 205 may diffract while converging or diverging a collimated incident beam at the maximum diffraction efficiency, with the minimum aberration and blur. The beam tweaking assembly 215 may be disposed between the light source 210 and the diffractive lens 205. The detector 220 may be arranged at a measurement plane 235 with a predetermined distance from the diffractive lens 205.

The light source 210 may output a first probing beam 202 toward a light input surface 215-1 of the beam tweaking assembly 215. The first probing beam 202 may have a first beam divergence, and may have a first beam diameter at the light input surface 215-1 of the beam tweaking assembly 215. The beam divergence defines the scope of the spread of the beam over a propagation distance. The beam tweaking assembly 215 may be configured to tweak (or condition) the first probing beam 202, and output a conditioned, second probing beam 204. The second probing beam 204 may propagate toward the diffractive lens 205 from a light output surface 215-2 of the beam tweaking assembly 215.

An optical power of the beam tweaking assembly 215 may be configured or controlled, such that the second probing beam 204 output from the beam tweaking assembly 215 may be a non-collimated probing beam with a second beam diameter at the light output surface 215-2 of the beam tweaking assembly 215, and the second probing beam 204 may have a second beam divergence. As a result, when the second probing beam 204 reaches a light input surface 205-1 of the diffractive lens 205, the second probing beam 204 may have a third beam diameter at the light input surface 205-1 of the diffractive lens 205.

The diffractive lens 205 may diffract the second probing beam 204 as a plurality of diffracted beams 206-1, 206-2, and 206-3 propagating in different diffraction angles (with respect to a surface normal of the light outputting side of the diffractive lens 205) toward the detector 220. The diffracted beams 206-1, 206-2, and 206-3 may correspond to different diffraction orders, including, for example, a parent diffraction order (e.g., 206-1) and one or more satellite ghost diffraction orders (e.g., 206-2 and 206-3 in the example shown in FIG. 2A). For discussion purposes, FIG. 2A shows three diffracted beams 206-1, 206-2, and 206-3. In some embodiments, the diffractive lens 205 may diffract the second probing beam 204 as any suitable number of diffracted beams, which may include one or more parent diffraction orders and one or more satellite ghost diffraction orders.

At the measurement plane 235, the diffracted beams 206-1, 206-2, and 206-3 may be detected by the detector 220 as beam spots (or diffraction order spots) 208-1, 208-2, and 208-3. The beam tweaking assembly 215 may be configured or adjusted by the controller 230 to reduce each size of each of the beam spots 208-1, 208-2, and 208-3 (hereinafter "beam spot size") to be sufficiently small, and to increase each separation distance between any two adjacent beam spots 208-1, 208-2, and 208-3 to be sufficiently large. For illustrative purposes and the convenience of description, the beam spots 208-1, 208-2, and 208-3 in FIG. 2A are shown and described as having a same beam spot size. It is understood that the beam spots 208-1, 208-2, 208-3 may have different beam spot sizes. Likewise, for illustrative purposes and the convenience of description, any two adjacent beam spots in FIG. 2A are shown as separated by a same separation distance. It is understood that the separation distances between different adjacent beam spots may be different. Each separation distance between any two adjacent beam spots 208-1, 208-2, and 208-3 may refer to a distance between geometric centers of the two adjacent beam spots, or may be defined in another suitable manner.

For discussion purposes, in FIG. 2A, each of the beam spots 208-1, 208-2, and 208-3 is presumed to have a circular shape with the same diameter. Thus, the size of the beam spot 208-1, 208-2, or 208-3 may be represented by the diameter of the beam spot, and the separation distance between two adjacent beam spots 208-1, 208-2, and 208-3 may be a distance between the centers of two beam spots.

In some embodiments, the detector 220 may include a single detection unit (e.g., a single photodiode). In some embodiments, the detector 220 may include a plurality of detection units arranged in an array (e.g., a photodiode array). Each detection unit (e.g., the single detection unit or each detection unit in the array) may have an active light receiving area configured to receive a light and generate a signal based on the received light. The active light receiving area may have a suitable shape, such as a circular shape with a diameter, or a square shape with a width, etc. For discussion purposes, the active light receiving area of each detection unit is presumed to have a circular shape or a square shape, and the size of the active light receiving area of each detection unit may be represented by the diameter of the circular shape or the width the square shape. For the detector 220 including a single detection unit, an entire active light receiving area of the detector 220 may be the same as the active light receiving area of the single detection unit. For the detector 220 including an array of detection units, an entire active light receiving area of the detector 220 may be the sum of the active light receiving areas of the detection units.

In some embodiments, the beam tweaking assembly 215 may be adjusted by the controller 230 to reduce the beam spot size (e.g., the diameter) of each beam spot at the measurement plane 235 to be smaller than the size (e.g., diameter or width) of the active light receiving area of the detector 220, and to increase the separation distance between any two adjacent beam spots to be greater than the size of the active light receiving area of the detector 220. As a result, the beam spots 208-1, 208-2, and 208-3 may be sufficiently separated from one another at the measurement plane 235, and each beam spot may be entirely and individually captured by the active light receiving area of the detector 220.

As each beam spot is entirely and individually captured by the detector 220, the optical power of each diffracted beam 206-1, 206-2, 206-3 may be determined (e.g., measured or calculated). Accordingly, the satellite ghost efficiency of the diffractive lens 205 for each satellite ghost diffraction order (e.g., 206-2 or 206-3) may be determined. The satellite ghost efficiency may be calculated by dividing the optical power of the beam (e.g., 206-2 or 206-3) output from the diffractive lens 205 corresponding to a satellite ghost diffraction order by the optical power of the second probing beam 204 incident onto the diffractive lens 205. Various methods may be used to measure the optical power of the diffracted beams 206-1, 206-2, 206-3 (or the beam spots 208-1, 208-2, 208-3). In some embodiments, the system 200 may include an optical power meter 222 movable to different locations within the measurement plane 235 to measure the optical power of each beam (or beam spot). In some embodiments, the optical power meter 222 may be omitted, and the optical power of each beam may be determined by the controller 230 based on signals received from the detector 220. Other suitable methods may also be used for measuring the optical power of the beams 206-1, 206-2, 206-3.

The controller 230 may be communicatively coupled with the light source 210, the beam tweaking assembly 215, the detector 220, and/or the diffractive lens 205 to control the operations thereof. The controller 230 may include a processor or processing unit 231. The processor 231 may be any suitable processor, such as a central processing unit ("CPU"), a graphic processing unit ("GPU"), etc. The controller 230 may include a storage device 232. The storage device 232 may be a non-transitory computer-readable medium, such as a memory, a hard disk, etc. The storage device 232 may be configured to store data or information, including computer-executable program instructions or codes, which may be executed by the processor 231 to perform various controls or functions described in the methods or processes disclosed herein. For example, the storage device 232 may store data or signals acquired by the detector 220, which may be retrieved by the processor 231 for analysis.

Referring to FIG. 2A, the first probing beam 202 output from the light source 210 may have a predetermined wavelength range, such as a wavelength range within an operation wavelength range of the diffractive lens 205 (e.g., visible spectrum). In some embodiments, the first probing beam 202 may be a collimated probing beam, propagating along an optical axis 225 of the system 200. In some embodiments, the light source 210 may be a laser light source configured to emit a laser beam, such as a laser diode. The laser beam output from the laser light source is presumed to be collimated. For discussion purposes, the term "collimated probing beam" means a substantially collimated probing beam with either zero beam divergence or a substantially small beam divergence that may be negligible (e.g., beam divergence smaller than a predetermined value).

In some embodiments, the light source 210 may include a single laser light source associated with a single laser wavelength. In some embodiments, the laser beam may have a wavelength that is substantially the same as a design or operation wavelength of the diffractive lens 205. In some embodiments, the light source 210 may include a plurality of laser light sources associated with multiple different laser wavelengths that are substantially the same as respective design wavelengths of the diffractive lens 205, and the system 200 may be used to measure the satellite ghost efficiency of the diffractive lens 205 at different design or operation wavelengths.

The first probing beam 202 may propagate toward the beam tweaking assembly 215 before reaching the diffractive lens 205. The first probing beam 202 may have the first beam diameter at the light input surface 215-1 of the beam tweaking assembly 215. The beam tweaking assembly 215 may convert the first probing beam 202 into the second probing beam 204, while transmitting the first probing beam 202. For discussion purposes, the first probing beam 202 and the second probing beam (or non-collimated beam) 204 are presumed to have the same optical power.

In some embodiments, the second probing beam 204 may be a non-collimated probing beam with the second beam diameter at the light output surface 215-2 of the beam tweaking assembly 215. The second probing beam 204 may have the second beam divergence. In some embodiments, the second beam divergence of the second probing beam 204 may be greater than the first beam divergence of the first probing beam 202.

In some embodiments, the beam tweaking assembly 215 may be configured or adjusted by the controller 230 such that the second beam diameter of the second probing beam 204 at the light output surface 215-2 of the beam tweaking assembly 215 is smaller than the first beam diameter of the first probing beam 202 at the light input surface 215-1 of the beam tweaking assembly 215. In some embodiments, the second beam diameter may be reduced by the beam tweaking assembly 215 to be equal to or smaller than about 50%, about 45%, about 40%, about 35%, about 30%, about 25%, or about 20% of the first beam diameter. The percentage may be any other suitable value selected from a range of 10% to 50%, 20% to 50%, 30% to 50%, 40% to 50%, 10% to 20%, 20% to 30%, 30% to 40%, 10% to 30%, 10% to 40%, 20% to 40%, 20% to 50%, 30% to 50%, or any other suitable range.

The second probing beam (e.g., non-collimated probing beam) 204 may propagate from the beam tweaking assembly 215 toward the diffractive lens 205. The diffractive lens 205 may provide an optical power to the second probing beam 204, thereby converging or diverging the second probing beam 204 while diffracting the second probing beam 204. In the embodiment shown in FIG. 2A, the beam tweaking assembly 215 and the diffractive lens 205 are shown as being spaced apart from one another by a gap. In some embodiments, the beam tweaking assembly 215 and the diffractive lens 205 may be stacked without a gap (e.g., through direct contact).

The second probing beam (e.g., non-collimated probing beam) 204 may be incident onto the diffractive lens 205. In some embodiments, as shown in FIG. 2A, the diffractive lens 205 may have the light input surface 205-1 facing the beam tweaking assembly 215, and a light output surface 205-2 facing the detector 220. The second probing beam (e.g., non-collimated probing beam) 204 may have the third beam diameter at the light input surface 205-1 of the diffractive lens 205. In some embodiments, the third beam diameter of the second probing beam 204 at the light input surface 205-1 of the diffractive lens 205 may be smaller than the second beam diameter of the second probing beam 204 at the light output surface 215-2 of the beam tweaking assembly 215. The diffractive lens 205 may diffract the second probing beam (e.g., non-collimated probing beam) 204 as the diffracted beams 206-1, 206-2, and 206-3 propagating toward the measurement plane 235 from the light output surface 205-2. For discussion purposes, each diffracted beam 206-1, 206-2, or 206-3 in FIG. 2A is shown as having the third beam diameter at the light output surface 205-2 of the diffractive lens 205.

In some embodiments, the beam tweaking assembly 215 may include one or more suitable lenses arranged in an optical series, such as one or more lenses with a fixed optical power (e.g., glass lenses, or polymer lenses, etc.), one or more lenses with a variable optical power (e.g., liquid crystal lenses, or liquid lenses, etc.), or a combination thereof, etc. The parameters (e.g., aperture, focal length or optical power, etc.) of the one or more lenses and the distance(s) between multiple lenses (if multiple lenses are included) may be configured or adjusted, e.g., by the controller 230, such that the beam tweaking assembly 215 may convert the first probing beam 202 into the second probing beam (e.g., non-collimated probing beam) 204 with a reduced beam diameter (e.g., second beam diameter) at the light output surface 215-2 of the beam tweaking assembly 215.

In some embodiments, the beam tweaking assembly 215 may be configured or adjusted by the controller 230 to provide an optical power that is opposite to the optical power of the diffractive lens 205. In some embodiments, an absolute value of the total optical power provided by the combination of the beam tweaking assembly 215 and the diffractive lens 205 may be smaller than a predetermined value (e.g., a value that is close to zero). In some embodiments, the predetermined value may be determined, in part, by the distance between the beam tweaking assembly 215 and the diffractive lens 205, the distance between the measurement plane 235 and the diffractive lens 205, the size of the active light receiving area of the detector 220 or the size of the active light receiving area of a single detection unit in the detector 220 (if the detector 220 includes multiple single detection units), and/or the distance between adjacent detection units in the detector 220 (if the detector 220 includes multiple detection units), etc.

In some embodiments, the beam tweaking assembly 215 may be configured or adjusted by the controller 230 to provide a variable optical power to the first probing beam 202. The controller 230 may control one or more components included in the beam tweaking assembly 215 to change the optical power of the beam tweaking assembly 215, thereby adjusting the second beam diameter and/or the second beam divergence of the second probing beam (e.g., non-collimated probing beam) 204 at the light output surface 215-2 of the beam tweaking assembly 215.

The optical power of the beam tweaking assembly 215 may be adjustable via a suitable external field, under the control of the controller 230. For example, in some embodiments, the beam tweaking assembly 215 may include two lenses with an adjustable distance therebetween. The two lenses may be lenses with fixed optical powers, lenses with variable optical powers, or a combination of a lens with a fixed optical power and a lens with a variable optical power. In some embodiments, at least one of the two lenses may be mounted on a movable supporting structure, which may be controlled by the controller 230. The distance between the two lenses may be adjusted when the controller 230 controls the movable supporting structure to move to different positions.

In some embodiments, the optical power of the beam tweaking assembly 215 may be adjusted by adjusting the optical power of a variable lens (which may be controlled by the controller 230) included in the beam tweaking assembly 215. For example, the optical power of a liquid crystal lens included in the beam tweaking assembly 215 may be adjusted by the controller 230 via adjusting a voltage supplied from a power source (not shown in FIG. 2A) to electrodes included in the liquid crystal lens. The optical power of a liquid lens (which may include any suitable liquid) may be adjusted by the controller 230 via, adjusting a current or a voltage applied to electrodes of the liquid lens, or via controlling an actuator coupled with the liquid lens to cause the curvature of the liquid lens to change. The actuator may be a mechanical actuator, a piezoelectric actuator, or a voice coil actuator, etc. In some embodiments, the beam tweaking assembly 215 may include additional elements not shown in FIG. 2A, such as a spatial filter assembly, an aperture, and/or a polarizer, etc.

The diffractive lens 205 may function as a transmissive or reflective diffractive lens. A transmissive diffractive lens may diverge or converge an incident beam while substantially forwardly diffracting the incident beam. A reflective diffractive lens may diverge or converge an incident beam while substantially backwardly diffracting the incident beam. For illustrative purposes, FIG. 2A shows the diffractive lens 205 as a transmissive diffractive lens that substantially forwardly diffracts the second probing beam 204. In some embodiments, the diffractive lens 205 may have a fixed (constant) optical power. In some embodiments, the diffractive lens 205 may have a variable or adjustable optical power that is adjustable by an external field.

The detector 220 may be arranged at the measurement plane 235, and may aim toward the diffractive lens 205 to receive the diffracted beams 206-1, 206-2, and 206-3 (or beam spots 208-1, 208-2, 208-3). In some embodiments, the detector 220 may include an optical sensor configured to generate a signal based on a received light, such as a photodiode, a charge-coupled device ("CCD") sensor, a complementary metal-oxide-semiconductor ("CMOS") sensor, an N-type metal-oxide-semiconductor ("NMOS") sensor, a pixelated polarized camera, or any other optical sensors. In some embodiments, the detector 220 may include a single detection unit (or pixel). For example, the detector 220 may be a single photodiode having an active light receiving area for photon detection. In some embodiments, the detector 220 may include a 2D array of detection units (or pixels), each of which may be a photodiode having an active light receiving area for photon detection. For example, the detector 220 may be a camera including a 2D array of pixels. In some embodiments, the detector 220 may also be referred to as an imaging device.

In some embodiments, the detector 220 may be mounted to a movable supporting structure (not shown). The movable supporting structure may be a stage, a frame, or an arm. The movable supporting structure may be configured to be translatable along the x-axis and y-axis directions and/or rotatable around the z-axis, such that the detector 220 may be translated and/or rotated within the measurement plane 235. In some embodiments, the movable supporting structure may also be translatable along the z-axis to adjust the distance between the measurement plane 235 and the diffractive lens 205 that is a sample being tested. In some embodiments, the controller 230 may be communicatively coupled with the movable supporting structure, and may control the rotational and/or translational movements of the movable supporting structure. In some embodiments, the movable supporting structure may be translatable in one or more linear directions, thereby translating or moving the detector 220 in the one or more linear directions within the measurement plane 235, e.g., the x-axis direction and/or the y-axis direction shown in FIG. 2A. Thus, the detector 220 may be moved to a plurality of measurement positions within the measurement plane 235 to detect the diffracted beam spots 208-1, 208-2, and 208-3.

It is noted that when the diffractive lens 205 is a reflective diffractive lens rather than a transmissive diffractive lens, the configurations of the system 200 may be modified by changing the location of the measurement plane 235 to receive the backwardly diffracted beams output from the diffractive lens 205. The working principle described herein using the transmissive diffractive lens as an example may be similarly applied to a reflective diffractive lens, which is not repeated.

In some embodiments, the measurement plane 235 may have a predetermined distance from the diffractive lens 205. In the disclosed embodiments, the predetermined distance between the measurement plane 235 and the diffractive lens 205 may be configured to be about 0.5 m-1.0 m, 0.6 m-1.0 m, 0.7 m-1.0 m, 0.8 m-1.0 m, 0.9 m-1.0 m, 1.0 m-1.5 m, or 1.5 m-2.0 m, etc.

During the process of measuring the satellite ghost efficiency of the diffractive lens 205, the detector 220 may detect (or generate, record) a beam spot pattern 237 of the diffracted beams 206-1, 206-2, and 206-3 (or beam spots 208-1, 208-2, and 208-3) at the measurement plane 235. In the beam spot pattern 237 may be represented by signals or image data generated by the detector 220. In the beam spot pattern 237, the beam spots 208-1, 208-2, and 208-3 may be distributed in a predetermined direction, e.g., the y-axis direction. In some embodiments, the controller 230 may control the detector 220 to move within the measurement plane 235 to a plurality of measurement positions to detect each of the beam spots 208-1, 208-2, and 208-3, thereby detecting (or generating, recording) the beam spot pattern 237. The controller 230 may analyze the beam spot pattern 237 to obtain information regarding sizes (e.g., diameters) of the beam spots 208-1, 208-2, and 208-3, positions of the beam spots 208-1, 208-2, and 208-3, separation distances between adjacent beam spots 208-1, 208-2, and 208-3, and/or optical powers of the diffracted beams 206-1, 206-2, and 206-3, etc. In some embodiments, the optical powers of the diffracted beams 206-1, 206-2, and 206-3 may be measured by the separate optical power meter 222.

The controller 230 may receive the signals or image data from the detector 220 representing the beam spot pattern 237, and may analyze the beam spot pattern 237 to determine whether the beam spots 208-1, 208-2, and 208-3 can be individually and separately identified. The term "individually" means that the entire beam spot is identified. That is, the size of the beam spot is smaller than the size of the active light receiving area of the detection unit of the detector 220. The term "separately" means that the adjacent beam spots do not overlap. For example, in some embodiments, the controller 230 may measure each separation distance between any two adjacent beam spots 208-1, 208-2, and 208-3, and each beam spot size of each beam spot 208-1, 208-2, or 208-3. The controller 230 may determine whether each separation distance is greater than a first predetermined value. The controller 230 may also determine whether the beam spot size of each beam spot 208-1, 208-2, or 208-3 is smaller than a second predetermined value. In some embodiments, the first predetermined value may be different from the second predetermined value. In some embodiments, the first predetermined value and the second predetermined value may be the same. For example, both of the first predetermined value and the second predetermined value may be the size (e.g., diameter or width) of the active light receiving area of the detection unit in the detector 220.

Based on a result of analyzing the beam spot pattern 237, the controller 230 may transmit control commands or signals to the beam tweaking assembly 215 to adjust or maintain the optical power of the beam tweaking assembly 215. For example, when the controller 230 determines, from the analysis of the beam spot pattern 237, that at least one separation distance is smaller than or equal to the size of the active light receiving area of the detection unit in the detector 220, and/or, at least one beam spot size is greater than or equal to the size of the active light receiving area of the detection unit in the detector 220, the controller 230 may continuously adjust the optical power of the beam tweaking assembly 215 provided to the first probing beam 202, until each separation distance is greater than the size of the active light receiving area of the detection unit in the detector 220, and each beam spot size is smaller than the size of the active light receiving area of the detection unit in the detector 220. In some embodiments, when the controller 230 determines that each separation distance is greater than the size of the active light receiving area of the detection unit in the detector 220, and each beam spot size is smaller than the size of the active light receiving area of the detection unit in the detector 220, the controller 230 may stop adjusting the optical power of the beam tweaking assembly 215, or may transmit control commands or signals to the beam tweaking assembly 215 to maintain the optical power of the beam tweaking assembly 215.

In some embodiments, the controller 230 may measure, from the analysis of the beam spot pattern 237, the separation distances between any two adjacent beam spots 208-1, 208-2, and 208-3, and determine whether each separation distance is greater than the size of the active light receiving area of the detection unit in the detector 220. When each separation distance between any two adjacent beam spots 208-1, 208-2, and 208-3 is greater than the size of the active light receiving area of the detection unit in the detector 220, the beam spot size of each beam spot 208-1, 208-2, or 208-3 may automatically become smaller than the size of the active light receiving area of the detection unit in the detector 220. Thus, when the controller 230 determines that at least one separation distance is smaller than or equal to the size of the active light receiving area of the detection unit in the detector 220, the controller 230 may transmit control commands or signals to the beam tweaking assembly 215 to continuously adjust the optical power of the beam tweaking assembly 215, until the controller 230 determines that each separation distance is greater than the size of the active light receiving area of the detection unit in the detector 220. Based on a determination that each separation distance is greater than the size of the active light receiving area of the detection unit in the detector 220, the controller 230 may stop adjusting the optical power of the beam tweaking assembly 215, or may transmit signals or control commands to the beam tweaking assembly 215 to maintain the optical power of the beam tweaking assembly 215.

In some embodiments, the controller 230 may measure the beam spot size of each beam spot 208-1, 208-2, or 208-3, and determine whether each beam spot size is smaller than the size of the active light receiving area of the detection unit in the detector 220. When the beam spot size of each beam spot 208-1, 208-2, or 208-3 is smaller than the size of the active light receiving area of the detection unit in the detector 220, each separation distance between any two adjacent beam spots 208-1, 208-2, and 208-3 may automatically become greater than the size of the active light receiving area of the detection unit in the detector 220. Thus, when the controller 230 determines that at least one beam spot size of the beam spots 208-1, 208-2, and 208-3 is greater than or equal to the size of the active light receiving area of the detection unit in the detector 220, the controller 230 may transmit control commands or signals to the beam tweaking assembly 215 to continuously adjust the optical power of the beam tweaking assembly 215, until the controller 230 determines that each beam spot size is smaller than the size of the active light receiving area of the detection unit in the detector 220. Based on a determination that each beam spot size is smaller than the size of the active light receiving area of the detection unit in the detector 220, the controller 230 may stop adjusting the optical power of the beam tweaking assembly 215, or may transmit signals or control commands to the beam tweaking assembly 215 to maintain the optical power of the beam tweaking assembly 215.

In some embodiments, to reduce the sizes of the beam spots 208-1, 208-2, and 208-3, and to increase the separation distances between any two adjacent beam spots 208-1, 208-2, and 208-3, the controller 230 may adjust the optical power of the beam tweaking assembly 215, thereby reducing the beam diameter of the diffracted beam 204, which may in turn cause a reduction in the size of the beam spots 208-1, 208-2, and 208-3, and an increase in the separation distance between any two adjacent beam spots 208-1, 208-2, and 208-3. Thus, the third beam diameter of the second probing beam 204 at the light input surface 205-1 of the diffractive lens 205 may be adjusted. Accordingly, the parameters of the diffracted beam 208-1, 208-2, or 208-3 (e.g., beam divergences, diffraction angles, etc.) output from the diffractive lens 205 may be adjusted. In other words, the beam spot pattern 237 formed by the diffracted beam spots 208-1, 208-2, and 208-3 at the measurement plane 235 may be adjusted, such that each beam spot 208-1, 208-2, or 208-3 may be separately and individually captured by the detector 220. Accordingly, the optical power of each diffracted beam 206-1, 206-2, 206-3 may be separately and individually determined (e.g., measured or calculated).

For example, the beam spot 208-1, 208-2, or 208-3 may be a circular beam spot, the detector 220 may be a single photodiode having a circular active light receiving area with a 10-mm diameter. When the beam spot size (or diameter) of each beam spot (or diffraction order spot) 208-1, 208-2, or 208-3 is smaller than a first predetermined value (e.g., the diameter of the active light receiving area, 10 mm), and any two adjacent beam spots 208-1, 208-2, and 208-3 are separated by a separation distance greater than a second predetermined value (e.g., the diameter of the active light receiving area, 10 mm), the controller 230 may determine that each beam spot 208-1, 208-2, or 208-3 in the beam spot pattern 237 is separately and individually identifiable. The controller 230 may separately and individually identify each beam spot 208-1, 208-2, and 208-3. The optical power of each diffracted beam 206-1, 206-2, or 206-3 may be determined (e.g., measured or calculated), e.g., based on data from the beam spot pattern 237, or based on measurement from the standalone optical power meter 222. Thus, the diffraction efficiency of the diffractive lens 205 for each diffracted beam 206-1, 206-2, or 206-3 may be determined as described above.

For illustrative purposes, FIG. 2A shows that when the diffracted beams 206-1, 206-2, and 206-3 form the beam spot pattern 237 at the far measurement plane 235 in which each beam spot 208-1, 208-2, or 208-3 can be separately and individually identified, the diffracted beams 206-1, 206-2, and 206-3 may also form a beam spot pattern 242 at a near measurement plane 240. The far measurement plane 235 is located farther away from the diffractive lens 205 than the near measurement plane 240. Each beam spot in the beam spot pattern 242 may not be separately and individually identified due to the overlapping beam spots and the large beam spot size (e.g., larger than the size of the active light receiving area of the detection unit of the detector 220).

Any suitable control algorithm, such as a closed-loop feedback control algorithm may be encoded in the controller 230 to continuously adjust the optical power provided by the beam tweaking assembly 215 to the first probing beam 202, until each beam spot 208-1, 208-2, or 208-3 in the beam spot pattern 237 is separately and individually identifiable (e.g., until each beam spot size is smaller than the size of the active light receiving area of the detection unit included in the detector 220 and each separation distance between any two adjacent beam spots is greater than the size of the active light receiving area of the detection unit included in the detector 220). The controller 230 may continuously receive signals (or image data or feedback) from the detector 220, analyze the signals to determine whether each beam spot is separately and individually identifiable.

If each beam spot is not separately and individually identifiable (e.g., if at least one beam spot size is greater than or equal to the size of the active light receiving area of the detection unit included in the detector 220, or at least one separation distance between any two adjacent beam spots is smaller than or equal to the size of the active light receiving area of the detection unit included in the detector 220), the controller 230 may continuously adjust the optical power of the beam tweaking assembly 215 in real time to thereby adjust each beam spot size and each separation distance in the beam spot pattern 237 in real time, until the controller 230 determines that each beam spot size is smaller than the size of the active light receiving area of the detection unit in the detector 220, and each separation distance is greater than the size of the active light receiving area of the detection unit in the detector 220, i.e., until the beam spots can be separately and individually identified. It is understood that the beam spots to be separately and individually identified are beam spots of interest, and the present disclosure does not require all beam spots detected by the detector 220 at the measurement plane 235 to be separately and individually identified.

In some embodiments, the controller 230 may determine the optical power of each diffracted beam 206-1, 206-2, or 206-3 at the measurement plane 235 (i.e., the optical power of beam spots 208-1, 208-2, or 208-3) based on signals received from the optical power meter 222, or based on the signals received from the detector 220. Based on the optical power of the second probing beam (e.g., non-collimated probing beam) 204, and the determined optical power of each diffracted beam 206-1, 206-2, or 206-3 at the measurement plane 235, the controller 230 may determine the diffraction efficiency of the diffractive lens 205 for each diffracted beam 206-1, 206-2, or 206-3, by dividing the optical power of a diffracted beam by the optical power of the second probing beam 204. For example, the satellite ghost efficiency of the diffractive lens 205 for each satellite ghost diffraction order (e.g., 206-2 or 206-3) may be determined by dividing the optical power of the beam 206-2 or 206-3 by the optical power of the second probing beam 204. In some embodiments, based on the positions of the beam spots 208-1, 208-2, and 208-3, and the distance between the measurement plane 235 and the diffractive lens 205, the controller 230 may determine the diffraction angles of the diffracted beams 206-1, 206-2, and 206-3, and an angular separation between two adjacent diffracted beams among the beams 206-1, 206-2, and 206-3.

In some embodiments, based on the determined satellite ghost efficiency of the diffractive lens 205 for each satellite ghost diffraction order (e.g., 206-2 or 206-3), and the diffraction angles of each diffraction order 206-1, 206-2, and 206-3, the controller 230 may determine whether the satellite ghost efficiency of the diffractive lens 205 satisfies a satellite ghost efficiency criterion, or whether there is any irregularity in the diffraction angle. For example, the satellite ghost efficiency criterion may be the satellite ghost efficiency being smaller than a predetermined value (e.g., 1%, 0.5%, etc.). Such information may be used to improve quality control in the mass production of the diffractive lens 205. In some embodiments, the controller 230 may analyze the satellite diffraction efficiency measurement to determine and provide guidance for product quality control of the diffractive lens 205 in mass production. For example, the guidance may include adjusting the composition of the material for fabricating the diffractive lens 205, and adjusting the structure of the diffractive lens 205 to achieve a low satellite ghost efficiency.

In some embodiments, the diffractive lens 205 may operate in a plurality of optical states associated with different optical powers. That is, the diffractive lens 205 itself may have an adjustable optical power, which may be controlled by the controller 230 or a separate controller. As the diffractive lens 205 is adjusted to operate in different optical states in real time, the controller 230 may adjust the optical power of the beam tweaking assembly 215 accordingly in real time, such that the size of each beam spot 208-1, 208-2, or 208-3 is smaller than the size of the active light receiving area of the detection unit in the detector 220, and the separation distance between any two adjacent beam spots is greater than the size of the active light receiving area of the detection unit in the detector 220 to enable the satellite ghost efficiency measurement in real time.

Compared to a conventional system (e.g., the system 100 shown in FIG. 1C) that adopts a collimated beam as a probing beam for measuring the satellite ghost efficiency of a diffractive lens, the system 200 of the present disclosure may adopt a specifically designed or configured non-collimated beam (e.g., 204) with a suitable beam divergence and a suitable beam diameter at the light input surface 205-1 of the diffractive lens 205 as a probing beam for measuring the satellite ghost efficiency of the diffractive lens 205. Although a certain amount of collimation (the amount may be specifically determined based on specific application needs) of the probing beam is sacrificed, through the beam tweaking assembly 215, the disclosed system 200 achieves flexible measurability of the satellite ghost efficiency of the diffractive lens 205. The disclosed system and method for measuring satellite ghost efficiency of the diffractive lens 205 are featured with low cost, high detection sensitivity, high detection accuracy, and high detection reliability.

Further, in some embodiments, the beam tweaking assembly 215 may be disposed in front of the diffractive lens 205 and between the light source 210 and the diffractive lens 205. The beam tweaking assembly 215 may be controlled to provide an optical power to the first probing beam 202. Thus, the beam tweaking assembly 215 may provide the same optical power to all of the diffractive orders of interest of the diffractive lens 205. In a conventional system, a singlet lens is disposed behind a testing sample and between the testing sample and a detector. In this conventional configuration, the position or the optical power of the singlet lens need to be individually adjusted for each diffraction order to refocus each diffraction order to a measurement plane, which is time consuming and inefficient. With the disclosed system 200 having the beam tweaking assembly 215 disposed in front of the diffractive lens 205, the measurement complexity of the system 200 is reduced, the operations are simplified, and the detection efficiency is enhanced.

In some embodiments, the diffractive lens 205 may be polarization independent (or polarization non-selective), providing the same optical power to the second probing beam (e.g., non-collimated probing beam) 204 regardless of the polarization of the second probing beam 204. For example, the diffractive lens 205 having a negative optical power may diverge the second probing beam 204, while the diffractive lens 205 having a positive optical power may converge the second probing beam 204. In either situation, the beam tweaking assembly 215 may be configured to reduce the beam diameter of the probing beam 204 to an extent until the beam spots 208-1, 208-2, and 208-3 are separately and individually identifiable, such that the optical powers of the diffracted beams 206-1, 206-2, and 206-3 may be determined, and the satellite ghost efficiency may be determined for each satellite ghost order.

In some embodiments, the diffractive lens 205 may be polarization dependent (or polarization selective), providing different optical powers to the second probing beam 204 when the second probing beam 204 has different polarizations. For example, the diffractive lens 205 may be a PBP lens that provides a positive optical power to the second probing beam 204 (i.e., converge the second probing beam 204) when the second probing beam 204 has a predetermined polarization, and provide a negative optical power to the second probing beam 204 (i.e., diverge the second probing beam 204) when the second probing beam 204 has a polarization that is orthogonal to the predetermined polarization. In some embodiments, when the second probing beam 204 includes a first portion having the predetermined polarization and a second portion having the orthogonal polarization, the diffractive lens 205 may provide a positive optical power to the first portion (i.e., converge the first portion), and provide a negative optical power to the second portion (i.e., diverge the second portion). In some embodiments, the diffractive lens 205 may be a PVH lens that provides an optical power to the second probing beam 204 when the second probing beam 204 has the predetermined polarization, and may transmit the second probing beam 204 when the second probing beam 204 has the orthogonal polarization (without providing an optical power).

FIGS. 2B-2D illustrate various beam spot patterns formed by the diffracted beams of the diffractive lens 205 at the measurement plane 235 when the beam tweaking assembly 215 included in the system 200 shown in FIG. 2A is controlled to provide various optical powers, according to various embodiments of the present disclosure. The diffractive lens 205 may be polarization dependent. For discussion purposes, the second probing beam (e.g., non-collimated probing beam) 204 may include a first portion that is right-handed ("RH") circularly polarized and a second portion that is left-handed ("LH") circularly polarized. For discussion purposes, the diffractive lens 205 may be a PBP lens configured to provide a positive optical power (i.e., converge) to the first portion that is RH circularly polarized, and provide a negative optical power (i.e., diverge) to the second portion that is LH circularly polarized.

Referring to FIGS. 2B-2D, the diffractive lens 205 may diffract the second probing beam (e.g., non-collimated probing beam) 204 into a parent diffraction order forming a beam spot 258, a first series of satellite ghost diffraction orders forming a first series of beam spots 259a, 259b, 259c located at the right side of the beam spot 258, and a second series of satellite ghost diffraction orders forming a second series of beam spots 259d, 259e, 259f located at the left side of the beam spot 258. The first series of satellite ghost diffraction orders may be the diffracted beams of the first portion (e.g., RH circularly polarized portion) of the second probing beam 204, and the second series of satellite ghost diffraction orders may be the diffracted beams of the second portion (e.g., LH circularly polarized portion) of the second probing beam 204.

FIG. 2B illustrates a beam spot pattern 257 at the measurement plane 235 when the controller 230 controls the beam tweaking assembly 215 to provide a first optical power. FIG. 2B shows that the beam spots 259a-259f have substantially the same beam spot size, which is relatively larger as compared to the beam spot 258. The separation distances between any two adjacent beam spots in the first series of beam spots 259a-259c are small, and the separation distances between any two adjacent beam spots in the second series of beam spots 259d-259f are also small.

FIG. 2C illustrates a beam spot pattern 267 at the measurement plane 235 when the controller 230 controls the beam tweaking assembly 215 to provide a second optical power to reduce the size of the beam spots in the first series and the second series. FIG. 2C shows that the beam spots 259a-259f have substantially the same beam spot size, which is reduced as compared to the beam spot size of the beam spots 259a-259f in the beam spot pattern 257 shown in FIG. 2B. At least partially because of the reduction in the beam spot size, the separation distances between two adjacent beam spots in the first series of beam spots 259a-259c are relatively larger as compared to the separation distances shown in FIG. 2B. The separation distances between any two adjacent beam spots in the second series of beam spots 259d-259f are also relatively larger as compared to the separation distances shown in FIG. 2B. That is, as the controller 230 controls the beam tweaking assembly 215 to provide the second optical power (changed from the first optical power), in each of the first series of beam spots 259a-259c and the second series of beam spots 259d-259f, the beam spot size of a single beam spot may be reduced as compared to the beam spot size in the beam spot pattern 257 shown in FIG. 2B. As a result, the separation distance between two adjacent beam spots may be increased.

FIG. 2D illustrates a beam spot pattern 287 at the measurement plane 235 when the controller 230 controls the beam tweaking assembly 215 to provide a third optical power, which may be an increase or decrease from the second optical power. The change from the second optical power to the third optical power may be in the same trending direction as the change from the first optical power to the second optical power. With the third optical power, the beam tweaking assembly may further focus the first portion (e.g., RH circularly polarized portion) of the second probing beam 204. The beam spot size of the beam spots 259a, 259b, or 259c in the first series may be further reduced, whereas the beam spot size of the beam spots 259d, 259e, or 259f in the second series may be increased. For example, if from the first optical power to the second optical power is an increase in the optical power, then the third optical power is an increase from the second optical power. In other words, FIGS. 2C and 2D show that in some embodiments, further increasing the optical power of the beam tweaking assembly 215 may render one of the first series of beam spots and the second series of beam spots being not separately and individually identifiable due to the smudge (or overlapping) of the beam spots and the increase of the beam spot size.

Comparing to FIG. 2C, in the beam spot pattern 287 shown in FIG. 2D, the beam spot size of the first series of beam spots 259a-259c does not change significantly (substantially unchanged), but the beam spot size of the second series of beam spots 259d-259f is increased significantly, which causes the beam spots 259d-259f to smudge (or overlap) together. Thus, the beam spots 259d-259f may not be separately and individually identified by the detector 220, although the beam spots 259a-259c may still be separately and individually identified by the detector 220. In some situations, when the quality of the sample is low, the beam spot pattern may be similar to that shown in FIG. 2D, i.e., satellite orders on one side of the parent order may have much larger beam spot sizes than the satellite orders on the other side of the parent order. In such situations, adjusting the optical power of the beam tweaking assembly 215 to an optimum value may achieve a beam spot pattern similar to that shown in FIG. 2C, in which the beam spot sizes of the satellite orders on both sides of the parent order are substantially equal. Then the satellite ghost efficiency of the satellite orders may be measured.

FIGS. 2B-2D show that to make most of the satellite ghosts in the first series of the beam spots 259a-259c and the second series of the beam spots 259d-259f separately and individually identifiable, an optimum optical power of the beam tweaking assembly 215 may exists at a certain value (e.g., the second optical power). With the optimum optical power, the beam spot size of the first series of the beam spots 259a-259c and the beam spot size of the second series of the beam spots 259d-259f may be substantially equal.

Figure 3A:
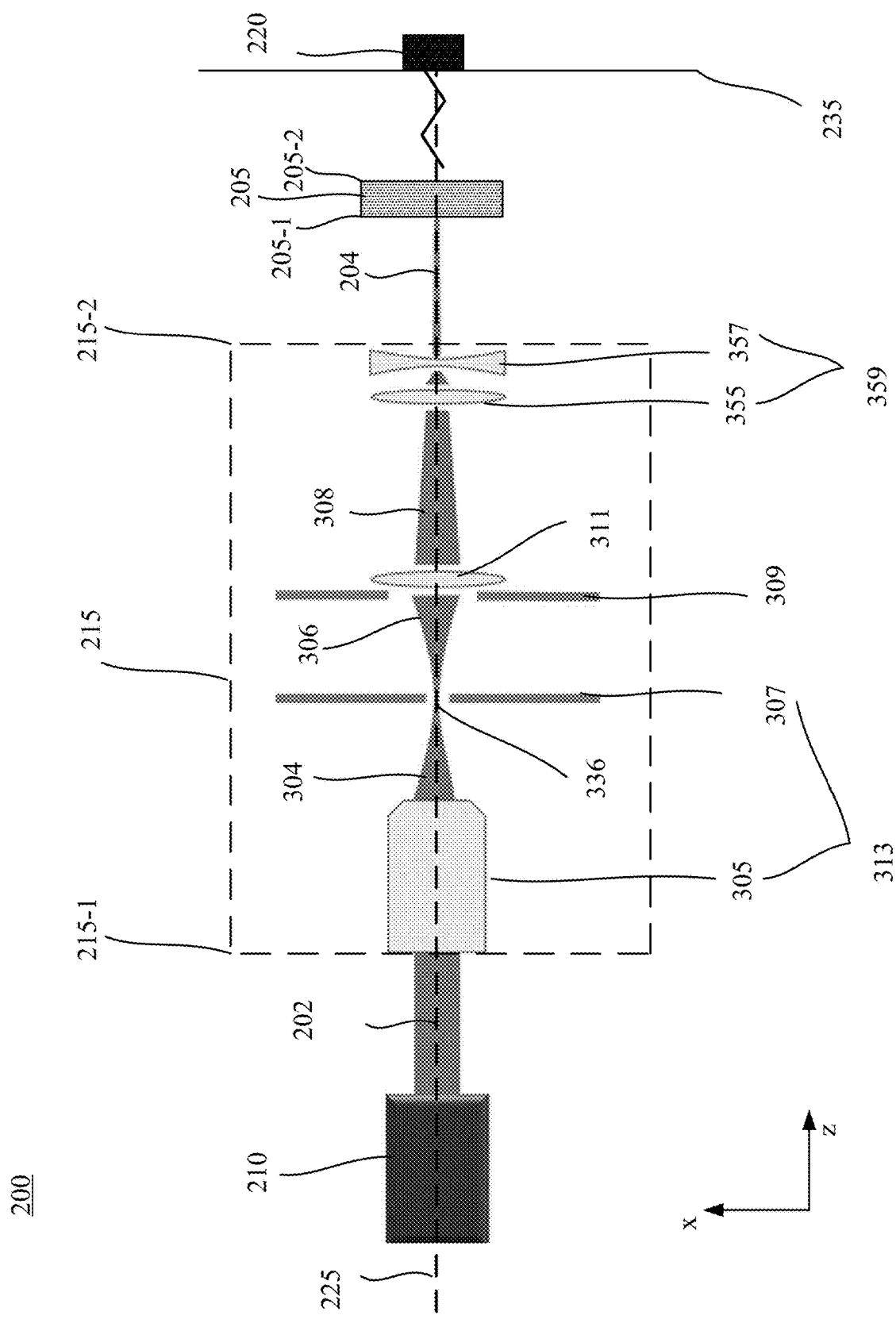
FIG. 3A illustrates a schematic diagram of the system of FIG. 2A, showing an exemplary structure for the beam tweaking assembly shown in FIG. 2A, according to an embodiment of the present disclosure.

FIG. 3A illustrates an x-z sectional view of the system 200 shown in FIG. 2A, with exemplary components shown for the beam tweaking assembly 215, according to an embodiment of the present disclosure. As shown in FIG. 3A, in some embodiments, the beam tweaking assembly 215 may include a first lens 305, a pinhole 307, a diaphragm (or an iris) 309, a second lens 311, and a reversed beam expander (or beam de-expander) 359 arranged in an optical series. The first lens 305 may be disposed between the light source 210 and the pinhole 307. The pinhole 307 may be disposed between the first lens 305 and the diaphragm 309. The diaphragm 309 may be disposed between the pinhole 307 and the second lens 311. The second lens 311 may be disposed between the diaphragm 309 and the reversed beam expander 359. The reversed beam expander 359 may be disposed between the second lens 311 and the diffractive lens 205 to be tested. In some embodiments, the beam tweaking assembly 215 may include additional elements not shown in FIG. 3A. In some embodiments, some of the elements include in the beam tweaking assembly 215 shown in FIG. 3A may be omitted.

In some embodiments, the first lens 305 and the pinhole 307 may function as a spatial filter 313 configured to "clean up" a laser beam when the light source 210 includes a laser light source. A laser beam produced by the laser light source may not have a smooth intensity profile. To produce a "clean" Gaussian beam with a relatively smooth intensity profile, the spatial filter 313 may be used to remove unwanted multiple-order energy peaks, and pass only the central maximum of the diffraction pattern. In addition, the spatial filter 313 may also remove additional spatial noise from the environment in which the laser beam propagates.

In some embodiments, the first lens 305 may include an objective lens (e.g., a microscope objective). The first lens 305 may focus the first probing beam 202 to a point 336 on the optical axis 225. For example, the first lens 305 may convert the first probing beam 202 into a probing beam 304 that is focused on the point 336, while transmitting the first probing beam 202. The pinhole 307 may be centered at the point 336, and may block unwanted noise annulus while passing most of the energy of the probing beam 304. Thus, the pinhole 307 may output a probing beam 306, e.g., a "clean" Gaussian beam, toward the diaphragm 309. The diaphragm 309 may further filter the probing beam 306 output from the spatial filter 313, and/or define the beam diameter of the probing beam 306 at a light input surface of the second lens 311.

In some embodiments, the point 336 to which the first probing beam 202 is focused may be deviated from a focal point of the first lens 305 along the optical axis 225. Thus, the second lens 311 may convert the probing beam 306 into a probing beam 308 that is a non-collimated beam. In the embodiment shown in FIG. 3A, the second lens 311 may have a longer effective focal length ("EFL") than the first lens (e.g., objective lens) 305. The probing beam 308 may be incident onto a light input surface of the reversed beam expander 359. The reversed beam expander 359 may be configured to further reduce the beam diameter of the probing beam 308 while transmitting the probing beam 308. For example, as shown in FIG. 3A, the reversed beam expander 359 may convert the probing beam 308 into the second (e.g., non-collimated) probing beam 204, which may be output from a light output surface of the reversed beam expander 359. The second beam diameter of the second probing beam 204 at the light output surface of the reversed beam expander 359 may be smaller than the beam diameter of the probing beam 308 at the light input surface of the reversed beam expander 359.

In some embodiments, the reversed beam expander 359 may include a plurality of lenses arranged in an optical series. For example, the reversed beam expander 359 may include a third lens 355 with a positive focal length and a fourth lens 357 with a negative focal length. The third lens 355 and the fourth lens 357 may be arranged in an optical series, with the third lens 355 being disposed upstream of the fourth lens 357 in the propagation direction of the probing beams. That is, the probing beam 308 may propagate through the third lens 355 before reaching the fourth lens 357. In some embodiments, the third lens 355 may be disposed between the second lens 311 and the fourth lens 357, and the fourth lens 357 may be disposed between the third lens 355 and the diffractive lens 205. For discussion purposes, FIG. 3A shows that the third lens 355 is a biconvex lens, and the fourth lens 357 is a biconcave lens. In some embodiments, the third lens 355 may be a suitable lens with a positive focal length, whereas the fourth lens 357 may be a suitable lens with a negative focal length.

The distance between the third lens 355 and the fourth lens 357 may be adjustable. For example, at least one of the third lens 355 or the fourth lens 357 may be mounted on a movable supporting structure (not shown), and the controller 230 may control the movable supporting structure to adjust the distance between the third lens 355 and the fourth lens 357. When the controller 230 adjust the distance between the third lens 355 and the fourth lens 357, a beam de-expansion ratio provided by the reversed beam expander 359 may be adjusted. The beam de-expansion ratio may be a ratio between the second beam diameter of the second (e.g., non-collimated) probing beam 204 at the light output surface of the reversed beam expander 359 and the beam diameter of the probing beam 308 at the light input surface of the reversed beam expander 359. The light input surface of the reversed beam expander 359 may be a light input surface of the third lens 355, and the light output surface of the reversed beam expander 359 may be a light output surface of the fourth lens 357. The light output surface of the reversed beam expander 359 may also be the light output surface 215-2 of the beam tweaking assembly 215.

In the embodiment shown in FIG. 3A, through adjusting the distance between the third lens 355 and the fourth lens 357 included in the reversed beam expander 359, the second probing beam (e.g., non-collimated probing beam) 204 may be conditioned to have the second beam diameter at the light output surface 215-2 of the beam tweaking assembly 215. Accordingly, when the second probing beam 204 reaches the light input surface 205-1 of the diffractive lens 205, the second probing beam 204 may have the third beam diameter at the light input surface 205-1 of the diffractive lens 205. The controller 230 may continuously adjust the distance between the third lens 355 and the fourth lens 357 to different distance values, thereby continuously adjusting the beam de-expansion ratio. In turn, the optical power provided by the beam tweaking assembly 215 to the first probing beam 202 may be continuously adjusted. As a result, in a beam spot pattern formed at the measurement plane 235 by the diffracted beams of the diffractive lens 205, each beam spot size and each separation distance may be continuously adjusted to achieve desirable values. The distance between the third lens 355 and the fourth lens 357 may be continuously adjusted until each beam spot (e.g., beam spot 208-1, 208-2, or 208-3 shown in FIG. 2A) formed by each diffracted beam (e.g., 206-1, 206-2, 206-3) at the measurement plane 235 is individually and separately identified by the controller 230. Accordingly, the satellite ghost efficiency of the diffractive lens 205 may be determined.

An experiment was set up based on the system 200 shown in FIG. 3A, and a beam spot pattern of a sample diffractive lens at a measurement plane was captured. In the experiment, the first probing beam 202 emitted from the light source 210 is a laser beam having a wavelength of 532 nm. The first lens 305 is a 10×microscope objective lens, and the pinhole 307 has a diameter of 15 μm. The second lens 311 has an effective focal length ("EFL") of 35 mm. The distance between the measurement plane 235 and the diffractive lens 205 is about 1 meter (m). In the experiment, the reversed beam expander 359 is realized by reversing a commercial beam expander. The detector 220 is a photodiode with a 10-mm-diameter circular active light receiving area. Through adjusting the distance between the third lens 355 and the fourth lens 357 included in the reversed beam expander 359 via a focus ring, the size of the beam spot (or diffraction order spot) 208-1, 208-2, or 208-3 formed by the diffracted beams at the measurement plane 235 is reduced to a range of about 1.5 mm to 5 mm (FWHM of 1 mm to 2.5 mm).

Figure 4A:
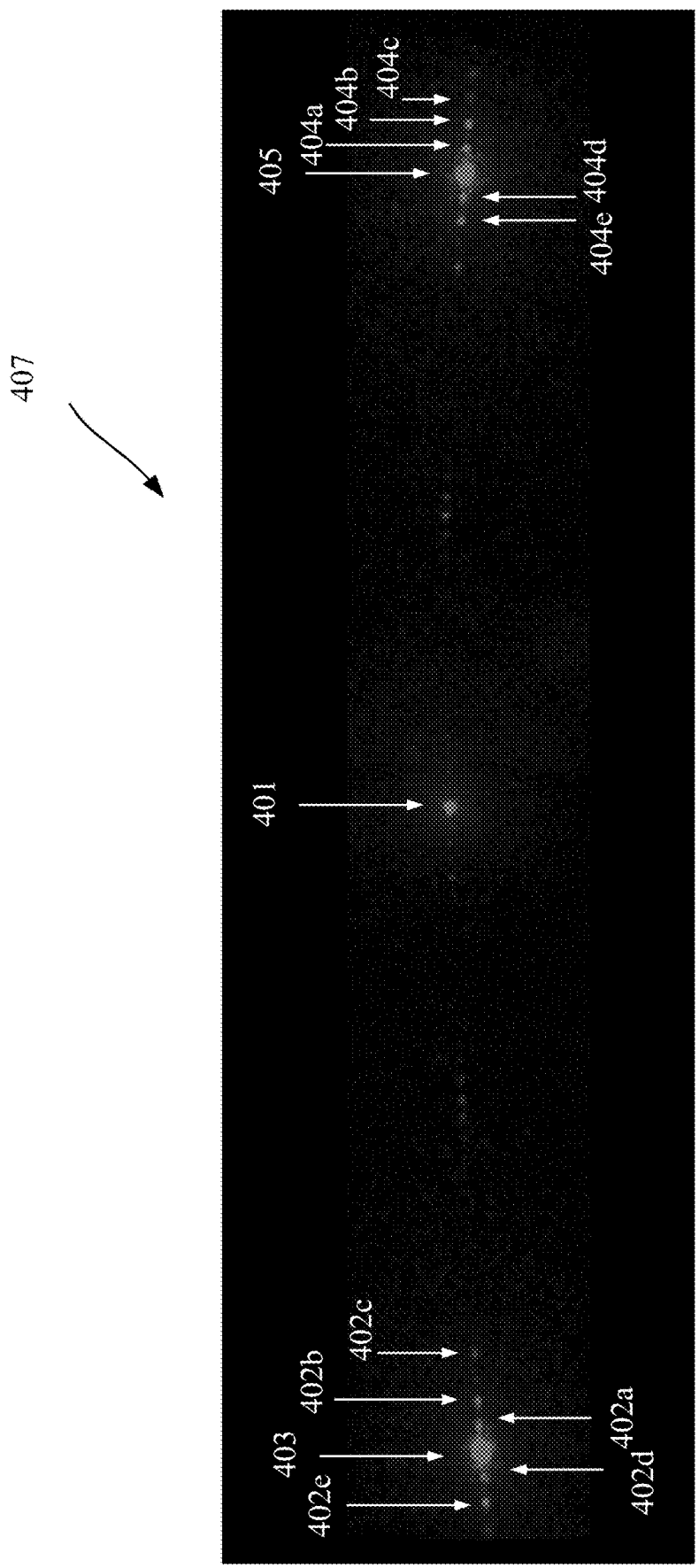
FIG. 4A illustrates an experimentally detected beam spot pattern of a diffractive lens at a measurement plane using the system shown in FIG. 3A, according to an embodiment of the present disclosure.

FIG. 4A illustrates an experimentally detected beam spot pattern 407 of the diffractive lens 205 at the measurement plane 235 using the experimental setup of the system 200 shown in FIG. 3A. The beam spot pattern 407 is detected or captured by the detector 220. The diffractive lens 205 used in the experiment is a PBP lens. As shown in FIG. 4A, the experimentally detected beam spot pattern 407 includes a first series of diffraction order spots (or beam spots) 401, 403, and 405, a second series of diffraction order spots (or beam spots) 402a-402e, and a third series of diffraction order spots (or beam spots) 404a-404e. Diffraction orders corresponding to the first series of diffraction order spots 401, 403, and 405 are parent diffraction orders (also referred to as 401, 403, and 405 for discussion purposes), e.g., $0^{th}$ order, $-1^{st}$ order, and $+1^{st}$ order.

Diffraction orders corresponding to the second series of diffraction order spots 402a-402e are satellite ghost diffraction orders (also referred to as 402a-402e for discussion purposes) of the parent diffraction order 403. The satellite ghost diffraction orders 402a-402e are sufficiently separated from the parent diffraction order 403 (e.g., each separation distance is greater than the diameter of the active light receiving area, 10 mm), and the beam spot size of each of the diffraction order spots 402a-402e is sufficiently small (e.g., each beam spot size is smaller than the diameter of the active light receiving area, 10 mm). Diffraction orders corresponding to the second series of diffraction order spots 404a-404e are satellite ghost diffraction orders (also referred to as 404a-404e for discussion purposes) of the parent diffraction order 405. The satellite ghost diffraction orders 404a-404e are sufficiently separated from the parent diffraction order 405 (e.g., each separation distance is greater than the diameter of the active light receiving area, 10 mm), and the beam spot size of each of the 404a-404e is sufficiently small (e.g., each beam spot size is smaller than the diameter of the active light receiving area, 10 mm). Thus, the diffraction order spots 401, 403, 405, 402a-402e, 404a-404e formed by the corresponding diffracted beams at the measurement plane 235 may be individually and separately identified by the controller 230. Accordingly, the satellite ghost efficiency of the diffractive lens 205 for each satellite ghost diffraction order may be determined.

Figure 4B:
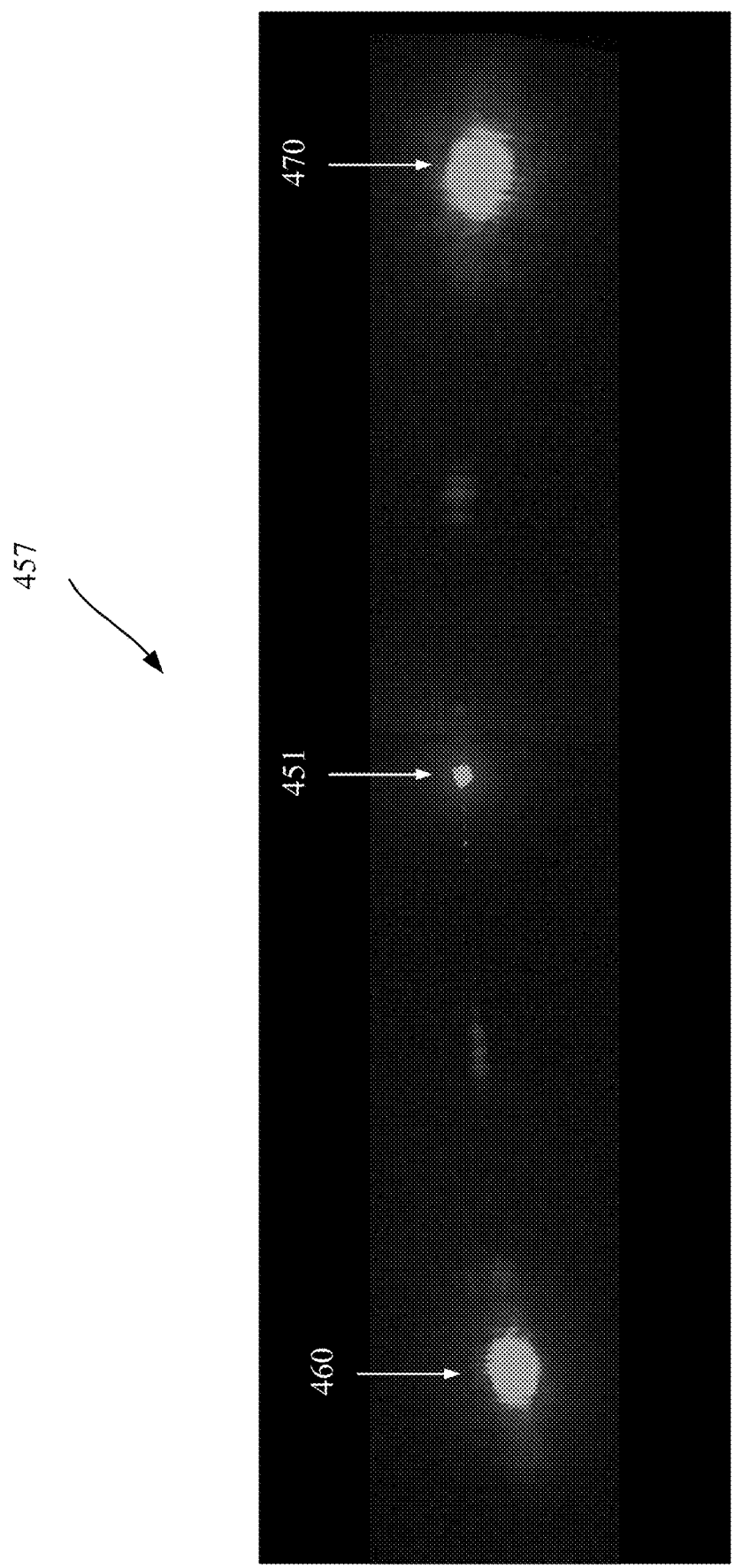
FIG. 4B illustrates an experimentally detected beam spot pattern of the same diffractive lens at the same measurement plane as those shown in FIG. 4A using a conventional system.

As a comparison, FIG. 4B illustrates an experimentally detected beam spot pattern 457 of the diffractive lens 205 at the measurement plane 235 using a conventional system (e.g., the system 100 shown in FIG. 1A) that does not include the beam tweaking assembly 215. As shown in FIG. 4B, without the beam tweaking assembly 215, the experimentally detected beam spot pattern 457 includes a small spot 451 at the center, and two relatively larger spots 460 and 470 at both sides of the small spot 451. The small spot 451 may be a diffraction order spot of a parent diffraction order (also referred to as 451 for discussion purposes), e.g., the $0^{th}$ order. The relatively larger spot 460 or 470 may include a diffraction order spot of a parent diffraction order, and diffraction order spots of a series of satellite ghost diffraction orders clustered together. The series of satellite ghost diffraction orders smudge with the parent diffraction order, resulting in the relatively larger, brighter spot 460 or 470 at the measurement plane 235. That is, the satellite ghost diffraction orders cannot be separately and individually identified from the parent diffraction order at the measurement plane 235 using a conventional system (e.g., the system 100 shown in FIG. 1A) that does not include the beam tweaking assembly 215.

Referring back to FIG. 3A, the second lens 311 and reversed beam expander 359 may be disposed in front of the diffractive lens 205 and between the light source 210 and the diffractive lens 205. The combination of the second lens 311 and reversed beam expander 359 may provide an optical power to the probing beam 306. The combination of the second lens 311 and reversed beam expander 359 may provide the same optical power to all of the diffractive orders of interest output from the diffractive lens 205. In a conventional system, a singlet lens is disposed behind a testing sample and between the testing sample and a detector. In this conventional configuration, the position or the optical power of the singlet lens need to be individually adjusted for each diffraction order to refocus each diffraction order to a measurement plane, which is time consuming and inefficient. With the disclosed system 200 having the combination of the second lens 311 and reversed beam expander 359 disposed in front of the diffractive lens 205 for testing, the measurement complexity of the system 200 is reduced, the operations are simplified, and the detection efficiency is enhanced.

Figure 3B:
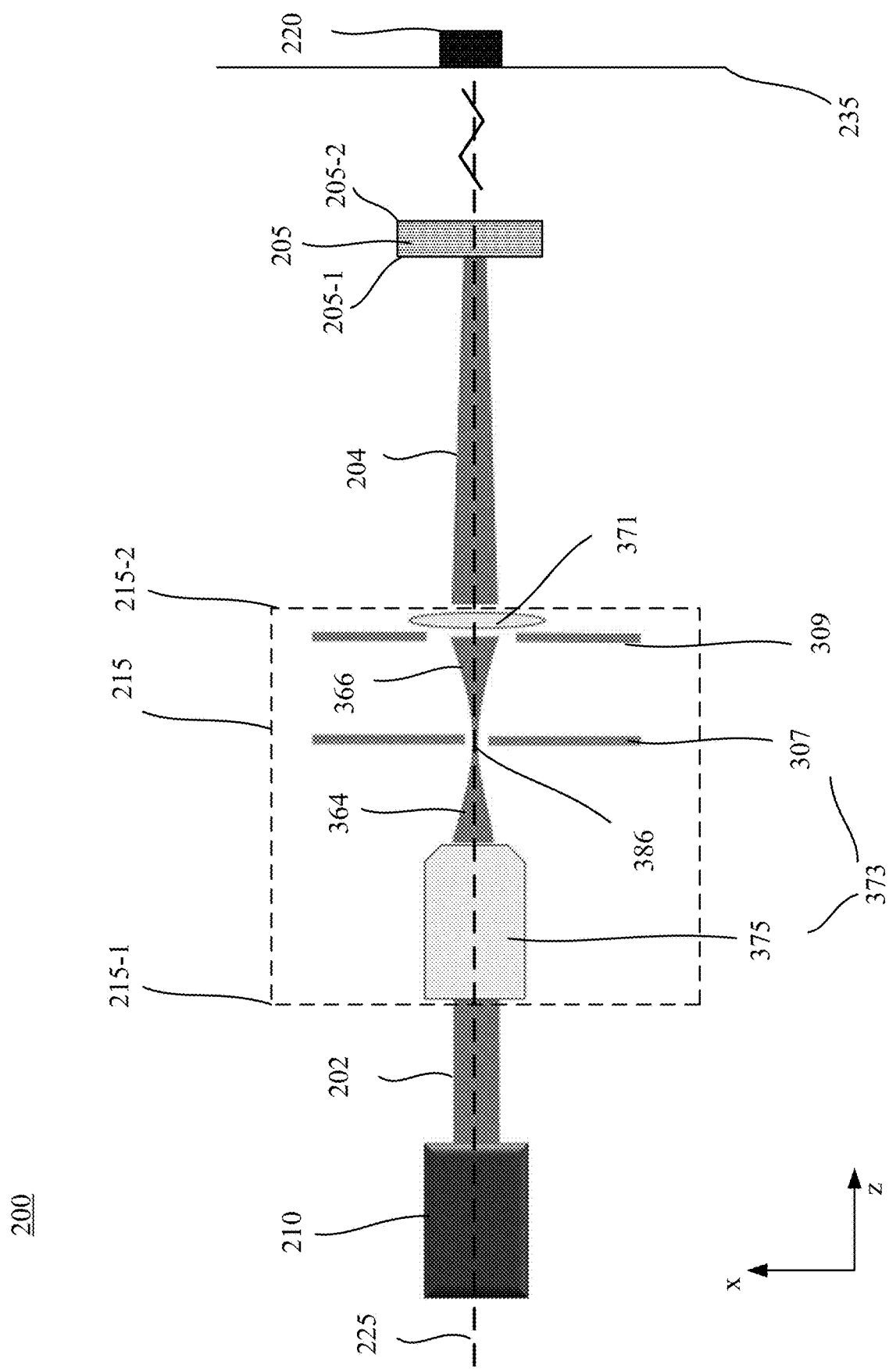
FIG. 3B illustrates a schematic diagram of the system of FIG. 2A, showing an exemplary structure for the beam tweaking assembly shown in FIG. 2A, according to another embodiment of the present disclosure.

FIG. 3B illustrates an x-z sectional view of the system 200, with exemplary components shown for the beam tweaking assembly 215, according to another embodiment of the present disclosure. The beam tweaking assembly 215 shown in FIG. 3B may include elements that are similar to the beam tweaking assembly 215 shown in FIG. 3A. Detailed descriptions of the same or similar elements included in the beam tweaking assembly 215 shown in FIG. 3A may refer to the above description rendered in connection with FIG. 3A.

In the embodiment shown in FIG. 3B, the beam tweaking assembly 215 may include a first lens 375, the pinhole 307, the diaphragm 309, and a second lens 371 arranged in an optical series. The first lens 375 may be disposed between the light source 210 and the pinhole 307. The pinhole 307 may be disposed between the first lens 375 and the diaphragm 309. The diaphragm 309 may be disposed between the pinhole 307 and the second lens 371. The second lens 371 may be disposed between the diaphragm 309 and the diffractive lens 205. In some embodiments, the beam tweaking assembly 215 may include additional elements not shown in FIG. 3B. In some embodiments, some of the elements included in the beam tweaking assembly 215 shown in FIG. 3B may be omitted.

In some embodiments, the first lens 375 and the pinhole 307 may function as a spatial filter 373, similar to the spatial filter 313 shown in FIG. 3A. The spatial filter 373 may be configured to "clean up" the first probing beam 202 output from the light source 210. The first lens 375 may convert the first probing beam 202 into a probing beam 364 that is focused on a point 386 on the optical axis 225, while transmitting the first probing beam 202. The pinhole 307 may be centered at a point 386, and may block the unwanted noise annulus while passing most of the energy of the probing beam 364. The pinhole 307 may output a probing beam 366, e.g., a "clean" Gaussian beam, toward the diaphragm 309. The diaphragm 309 may further filter the probing beam 366 output from the spatial filter 313 and/or define the beam diameter of the probing beam 366 at a light input surface of the second lens 371.

In some embodiments, the point 386 to which the probing beam 364 is focused may be deviated from a focal point of the first lens 375 along the optical axis 225. Thus, the second lens 371 may convert the probing beam 366 into the second probing beam 204 that is a non-collimated beam propagating toward the diffractive lens 205. In some embodiments, a waist ratio between an output beam and an input beam of the beam tweaking assembly 215 (e.g., a ratio between the second beam diameter of the second probing beam 204 at the light output surface 215-2 and the first beam diameter of the first probing beam 202 at the light input surface 215-1) may be determined by the ratio of the focal lengths of the second lens 371 and the first lens 375. That is, when the second lens 371 has a shorter EFL than the first lens 375, the second beam diameter of the second probing beam 204 at the light output surface 215-2 may be smaller than the first beam diameter of the first probing beam 202 at the light input surface 215-1. Through configuring the respective EFLs of the first lens 375 and the second lens 371, the second beam diameter of the second probing beam 204 at the light output surface 215-2 may be sufficiently small. As a result, in a beam spot pattern formed at the measurement plane 235 by the diffracted beams of the diffractive lens 205, each beam spot size and each separation distance may achieve desirable values. Thus, the reversed beam expander 359 shown in FIG. 3A may be omitted.

In some embodiments, the second lens 371 may have a fixed (or constant) optical power, and the controller 230 may control (or adjust) the optical power of the beam tweaking assembly 215 via adjusting the distance between the second lens 371 and the first lens 375. In some embodiments, the second lens 371 may have a variable optical power, and the controller 230 may control (or adjust) the optical power of the beam tweaking assembly 215 via adjusting at least one of the distance between the second lens 371 and the first lens 375, or the optical power of the second lens 371. The controller 230 may control (or adjust) the optical power of the beam tweaking assembly 215, such that the second probing beam (e.g., non-collimated probing beam) 204 output from the second lens 371 may have the second beam divergence and the second beam diameter at the light output surface 215-2 of the beam tweaking assembly 215. Accordingly, when the second probing beam (e.g., non-collimated probing beam) 204 reaches the light input surface 205-1 of the diffractive lens 205, the second probing beam 204 may have the predetermined third beam diameter at the light input surface 205-1 of the diffractive lens 205. Thus, each beam spot (or diffraction order spot) 208-1, 208-2, or 208-3 formed by the diffracted beams at the measurement plane 235 may be individually and separately identified by the controller 230. Accordingly, the satellite ghost efficiency of the diffractive lens 205 may be determined.

In FIG. 3B, the second lens 371 may be disposed in front of the diffractive lens 205 and between the light source 210 and the diffractive lens 205. The second lens 371 may be controlled to provide an optical power to the probing beam 366. The second lens 371 may provide the same optical power to all of the diffractive orders of interest output from the diffractive lens 205. In a conventional system, a singlet lens is disposed behind a testing sample and between the testing sample and a detector. In the conventional configuration, the position or the optical power of the singlet lens need to be individually adjusted for each diffraction order of a plurality of diffraction orders to refocus each diffraction order to a measurement plane, which is time consuming and inefficient. With the disclosed system 200 having the second lens 371 disposed in front of the diffractive lens 205, the measurement complexity of the system 200 is reduced, the operations are simplified, and the detection efficiency is enhanced.

In some embodiments, the second lens 311 shown in FIG. 3A may have a fixed (or constant) optical power, and the controller 230 may control (or adjust) the optical power of the beam tweaking assembly 215 via adjusting the distance between the second lens 311 and the first lens 305. In some embodiments, the second lens 311 shown in FIG. 3A may have a variable optical power, and the controller 230 may control (or adjust) the optical power of the beam tweaking assembly 215 via adjusting at least one of the distance between the second lens 311 and the first lens 305, or the optical power of the second lens 311. In some embodiments, the first lens 305 shown in FIG. 3A and/or the first lens 375 shown in FIG. 3B may have a variable optical power. In some embodiments, the third lens 355 and/or the fourth lens 357 shown in FIG. 3A may have a variable optical power.

The present disclosure also provides a method for measuring the satellite ghost efficiency of a diffractive lens. The method may be performed by one or more components included in the disclosed systems. Descriptions of the components, structures, and/or functions can refer to the above descriptions rendered in connection with FIG. 2A, FIG. 3A, and FIG. 3B. FIG. 5 is a flowchart illustrating a method 500 for measuring the satellite ghost efficiency of a diffractive lens, according to an embodiment of the present disclosure.

As shown in FIG. 5, the method 500 may include outputting, by a light source, a first probing beam to a beam tweaking assembly disposed between the light source and a diffractive lens, the beam tweaking assembly including one or more optical lenses, and an optical power of the beam tweaking assembly being adjustable (step 510). The first probing beam may have a first beam divergence and a first beam diameter at a light input surface of the beam tweaking assembly. In some embodiments, the first probing beam may be a substantially collimated beam.

The method may also include converting, by the beam tweaking assembly, the first probing beam into a second probing beam propagating toward the diffractive lens, the second probing beam being a non-collimated beam, the diffractive lens diffracting the second probing beam into a plurality of diffracted beams including a first diffracted beam of a parent diffraction order and a second diffracted beam of a satellite ghost diffraction order (step 520). The second probing beam may have a second beam divergence and a second beam diameter at a light output surface of the beam tweaking assembly. In some embodiments, the first beam divergence may be smaller than the second beam divergence. In some embodiments, the first beam diameter may be greater than the second beam diameter.

The method may further include generating, by a detector, a beam spot pattern including a first beam spot corresponding to the first diffracted beam and a second beam spot corresponding to the second diffracted beam (step 530). The beam spot pattern may include a plurality of beam spots corresponding the plurality of diffracted beams output from the diffractive lens. In some embodiments, the satellite ghost diffraction order corresponding to the second diffracted beam may be a first satellite ghost diffraction order, and the plurality of diffracted beams may also include a third diffracted beam of a second satellite ghost diffraction order. The beam spot pattern may include a third beam spot corresponding to the third diffracted beam.

The method 500 may include controlling, by a controller, the beam tweaking assembly to adjust a beam spot size of each of the first beam spot and the second beam spot and a separation distance between the first beam spot and the second beam spot until the beam spot size of each of the first beam spot and the second beam spot is smaller than a first predetermined value, and the separation distance is greater than a second predetermined value (step 540). In some embodiments, the first predetermined value may be substantially the same as the second predetermined value, which may be equal to the size of an active light receiving area of a detection unit included in the detector.

In some embodiments, the step 540 may include analyzing, by the controller, the beam spot pattern to determine whether the beam spot size of each of the first beam spot and the second beam spot is smaller than the first predetermined value, and the separation distance between the first beam spot and the second beam spot is greater than the second predetermined value. In some embodiments, the step 540 may also include, based on a determination that the beam spot size of at least one of the first beam spot or the second beam spot is greater than or equal to the first predetermined value, or the separation distance is smaller than or equal to the second predetermined value, adjusting, by the controller, the optical power of the beam tweaking assembly provided to the first probing beam until the beam spot size of each of the first beam spot and the second beam spot is smaller than the first predetermined value and the separation distance is greater than the second predetermined value.

The method 500 may include other steps not shown in the flowchart of FIG. 5. For example, the method 500 may also include controlling, by the controller (e.g., controller 230), the detector to move within the measurement plane to a plurality of measurement positions to detect the plurality of beam spots that form the beam spot pattern. Controlling the beam tweaking assembly to adjust respective beam spot sizes of the plurality of beam spots included in the beam spot pattern and respective separation distances between any two adjacent beam spots may include adjusting an optical power provided by the beam tweaking assembly to the first probing beam to adjust respective beam spot sizes of the plurality of beam spots included in the beam spot pattern and respective separation distances between any two adjacent beam spots. The method 500 may include analyzing, by the controller, the beam spot pattern to obtain the respective beam spot sizes of the plurality of beam spots, the respective positions of the plurality of beam spots, and the respective separation distances between any two adjacent beam spots. The controller 230 may compare each beam spot size with the first predetermine value to determine whether each beam spot size is smaller than the first predetermine value. If one of the beam spot sizes is greater than or equal to the first predetermine value, the controller 230 may continue to adjust the optical power of the beam tweaking assembly provided to the first probing beam until each beam spot size is smaller than the first predetermine value.

The controller 230 may compare each separation distance between any two adjacent beam spots with the second predetermine value. If there are different series or clusters of beam spots, there may be multiple separation distances for the different series or clusters, and the controller 230 may compare all separation distances with the second predetermine value. The controller 230 may determine whether each separation distance is greater than the second predetermine value. If one of the separation distances is smaller than or equal to the second predetermine value, the controller 230 may continue to adjust the optical power of the beam tweaking assembly until all separation distances are greater than the second predetermine value.

When the controller 230 determines that each beam spot size is smaller than the first predetermine value, and each separation distance is greater than the second predetermine value, the controller 230 may determine that each beam spot can be separately and individually identified, and the controller 230 may determine the optical power of each beam spot, or the optical powers of those beam spots of interest, such as the optical powers of the beam spots corresponding to the satellite ghost orders. The controller 230 may determine (e.g., calculate) the satellite ghost efficiency based on the optical power of one of the second diffracted beams corresponding to a satellite ghost diffraction orders and the optical power of the second probing beam (or the first probing beam).

FIG. 2A, FIG. 3A, and FIG. 3B show that the diffractive lens 205 is disposed perpendicular to the optical axis 225, or with a thickness direction of the diffractive lens 205 arranged parallel with the optical axis 225. In some embodiments, the diffractive lens 205 may not be disposed perpendicular to the optical axis 225, and may be tilted to form an acute angle relative to the optical axis 225. The principles of the disclosed system and method for measuring the satellite ghost efficiency of the diffractive lens 205 may also be applicable to the situation where the diffractive lens 205 is tilted at an acute angle with respect to the optical axis 225.

In the embodiments shown in FIG. 2A, FIG. 3A, and FIG. 3B, the diffractive lens 205 may be any suitable diffractive lens, such as a ruled diffractive lens, a holographic diffractive lens, a Fresnel lens, a liquid crystal based diffractive lens, a metasurface lens, a Pancharatnam-Berry phase ("PBP") lens, a polarization volume hologram ("PVH") lens, a diffractive lens based on surface relief structures, a diffractive lens based on volume Bragg grating ("VBG"), etc. The diffractive lens 205 may be a single-layer diffractive lens or a multi-layer diffractive lens. For illustrative purposes, FIG. 2A, FIG. 3A, and FIG. 3B show the diffractive lens 205 as a single-layer diffractive lens. In some embodiments, the diffractive lens 205 may have a multi-layer structure having two or more layers of optical films, plates, or elements. For example, the diffractive lens 205 may include a first layer and a second layer, at least one of which may be a lens. In some embodiments, the first layer may be a substrate that provides support and protection to other layers, films, and/or structures formed thereon, and the second layer may be an optical film that converges or diverges an incident beam while diffracting the incident beam. In some embodiments, the optical film may be a liquid crystal polymer ("LCP") layer. In some embodiments, the LCP layer may include polymerized (or cross-linked) liquid crystals ("LCs"), polymer-stabilized LCs, a photo-sensitive C polymer, or any combination thereof. The LCs may include nematic LCs, twist-bend LCs, chiral nematic LCs, smectic LCs, or any combination thereof. In some embodiments, the optical film may be a photo-sensitive polymer layer including a birefringent photo-refractive holographic material other than LCs, such as an amorphous polymer.

In some embodiments, the diffractive lens 205 may include one or more protecting films and one or more layers to provide optical functions. In some embodiments, the diffractive lens 205 may include an alignment structure or layer disposed between other layers, such as between a substrate and an optical film. The alignment structure may provide a predetermined alignment pattern to align the molecules in the optical film. In some embodiments, the diffractive lens 205 may include two substates, two alignment layers, and an LC layer disposed between the two alignment layers. The LC layer may include active LCs, and the diffraction efficiency of the diffractive lens 205 may be adjusted via adjusting the orientations of the LCs.

Figure 6A:
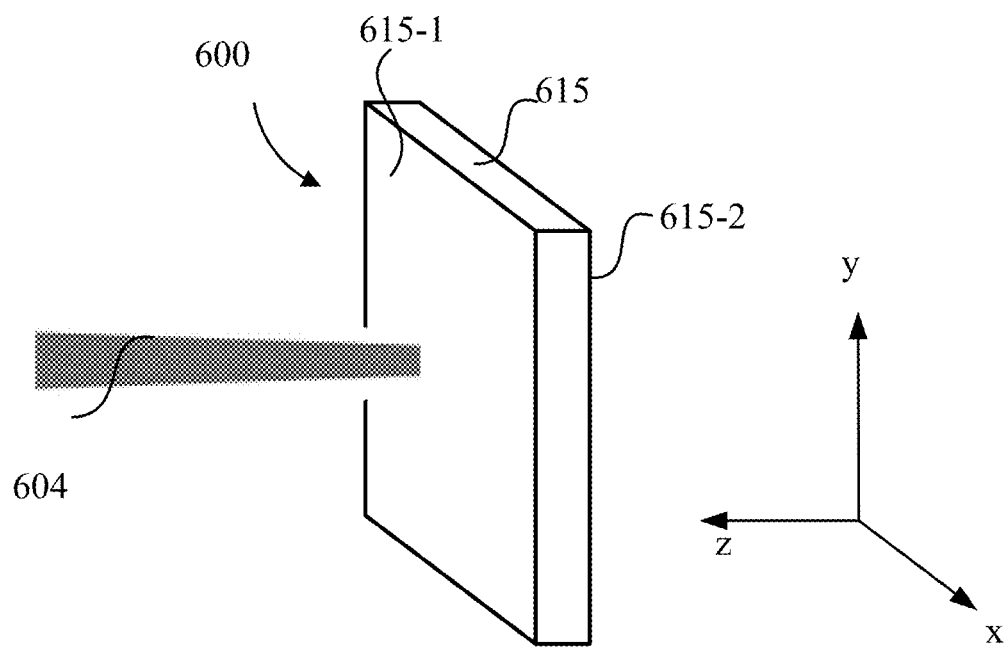
FIG. 6A schematically illustrates a three-dimensional ("3D") view of an optical film included in a diffractive lens, the satellite ghost efficiency of which may be measured by a disclosed system, according to an embodiment of the present disclosure.
Figure 6B:
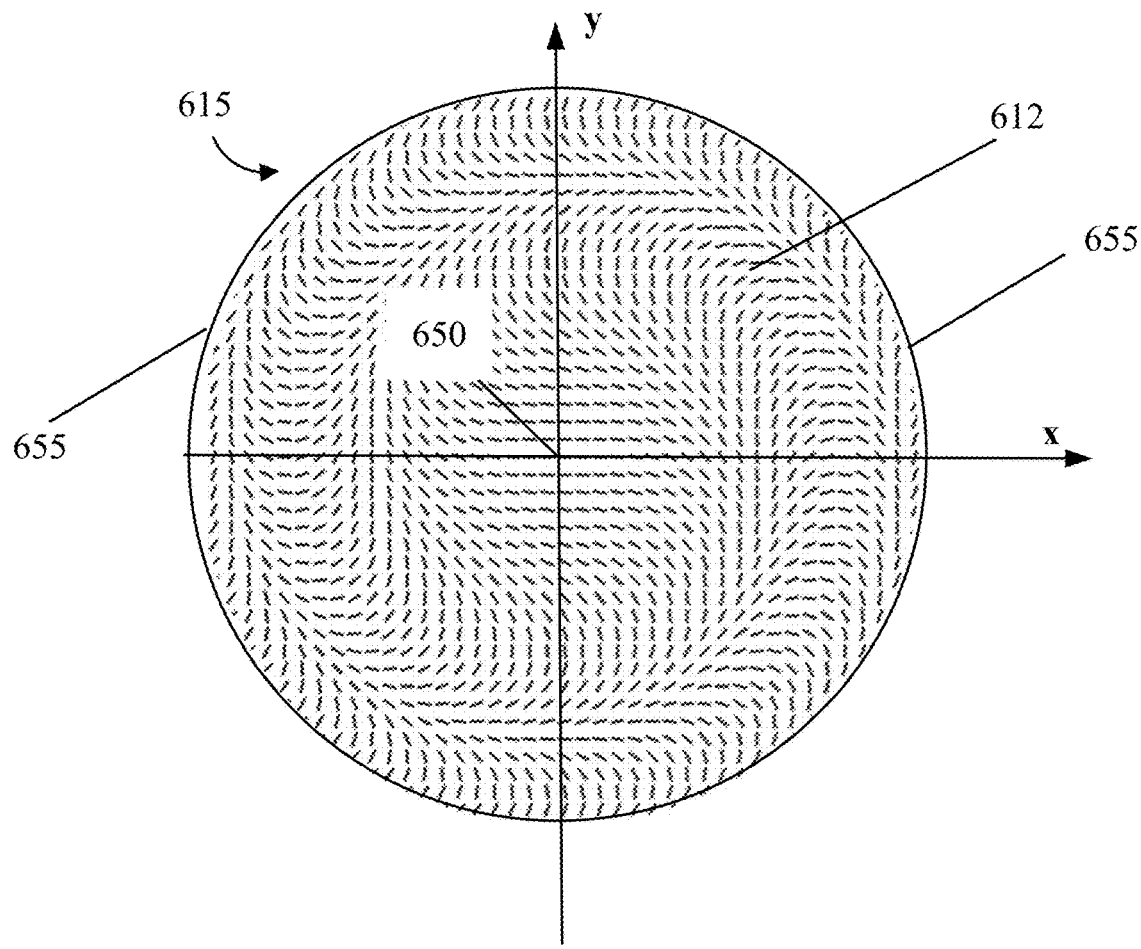
FIGS. 6B and 6C schematically illustrate various views of a portion of the optical film shown in FIG. 6A, showing in-plane orientations of optically anisotropic molecules in the optical film, according to an embodiment of the present disclosure.
Figure 6C:
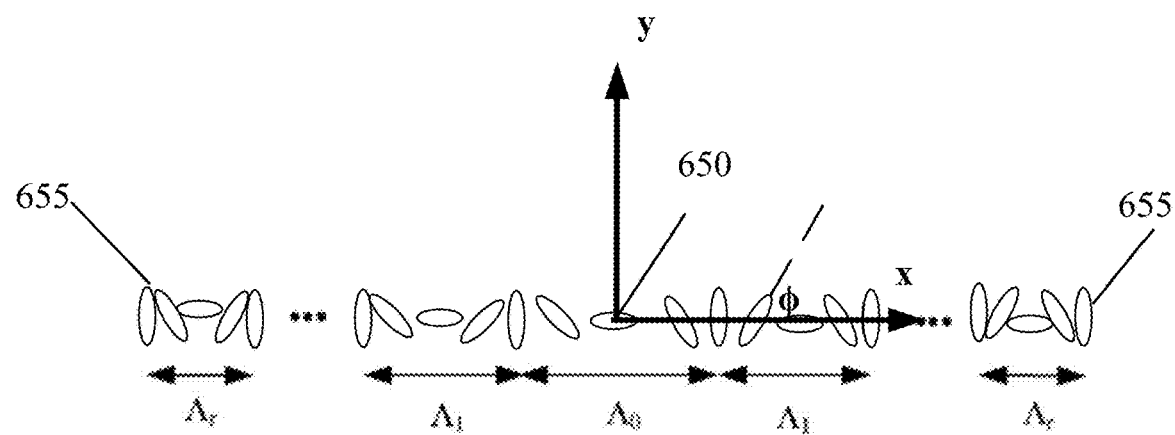

FIG. 6A illustrates a schematic three-dimensional ("3D") view of an optical film 600 that may be included in the diffractive lens 205 shown in FIG. 2A, 3A, or 3B, according to an embodiment of the present disclosure. A non-collimated beam 604 may be incident onto the optical film 600 as a probing beam for the satellite ghost diffraction efficiency measurement described above. FIGS. 6B-6C schematically illustrate various views of a portion of the optical film 600 shown in FIG. 6A, showing in-plane orientations of optically anisotropic molecules in the optical film 600, according to various embodiments of the present disclosure.

For illustrative purposes, the optical film 600 is shown as having a flat rectangular plate shape in FIG. 6A. It is understood that the optical film 600 may have any suitable shape, such as a circular shape. In some embodiments, one or both surfaces along the light propagating path of the non-collimated beam 604 may have curved shapes. In some embodiments, the optical film 600 may include a layer of a birefringent medium 615 with intrinsic or induced (e.g., photo-induced) optical anisotropy. For example, the birefringent medium 615 may include liquid crystals, liquid crystal polymers, and/or amorphous polymers, etc. The optical film 600 may also be referred to as a birefringent medium layer 600.

In some embodiments, the optical film 600 may be a polymer layer (or film). For example, in some embodiments, the optical film 600 may be a liquid crystal polymer ("LCP") layer. In some embodiments, the LCP layer may include polymerized (or cross-linked) LCs, polymer-stabilized LCs, photo-reactive LC polymers, or any combination thereof. In some embodiments, the optical film 600 may include active LCs. The LCs may include nematic LCs, twist-bend LCs, chiral nematic LCs, smectic LCs, or any combination thereof. In some embodiments, the optical film 600 may be a polymer layer including a birefringent photo-refractive holographic material other than LCs, such as an amorphous polymer.

The optical film 600 may have a first surface 615-1 (or a light input surface) and a second surface 615-2 (or a light output surface). The first surface 615-1 and the second surface 615-2 may be surfaces along the light propagating path of the incident light 604. In some embodiments, the first surface 615-1 may be an interface between the optical film 600 and a substrate (or an alignment structure, which is not shown) on which the optical film 600 is formed, and the second surface 615-2 may be an interface between the optical film 600 and a protecting film (e.g., a TAC film, which is not shown) or an outside environment (e.g., air), or an interface between the optical film 600 and another substrate (or another alignment structure, which is not shown).

The optical film 600 (or the birefringent medium 615 in the optical film 600) may include optically anisotropic molecules (e.g., LC molecules) configured with a three-dimensional ("3D") orientational pattern. In some embodiments, an optic axis of the birefringent medium 615 or optical film 600 may be configured with a spatially varying orientation in at least one in-plane direction. For example, the optic axis of the LC material may periodically or non-periodically vary in at least one in-plane linear direction, in at least one in-plane radial direction, in at least one in-plane circumferential (e.g., azimuthal) direction, or a combination thereof. The LC molecules may be configured with an in-plane orientation pattern, in which the directors of the LC molecules may periodically or non-periodically vary in the at least one in-plane direction. In some embodiments, the optic axis of the LC material may also be configured with a spatially varying orientation in an out-of-plane direction. The directors of the LC molecules may also be configured with spatially varying orientations in an out-of-plane direction. For example, the optic axis of the LC material (or directors of the LC molecules) may twist in a helical fashion in the out-of-plane direction.

FIGS. 6B and 6C schematically illustrate x-y sectional views of a portion of the optical film 600 shown in FIG. 6A, showing in-plane orientations of optically anisotropic molecules 612 in the optical film 600, according to various embodiments of the present disclosure. The in-plane orientations of the optically anisotropic molecules 612 in the optical film 600 shown in FIGS. 6B and 6C are for illustrative purposes. In some embodiments, the optically anisotropic molecules 612 in the optical film 600 may have other in-plane orientation patterns. For discussion purposes, rod-like LC molecules 612 are used as examples of the optically anisotropic molecules 612 of the optical film 600. The rod-like LC molecule 612 may have a longitudinal axis (or an axis in the length direction) and a lateral axis (or an axis in the width direction). The longitudinal axis of the LC molecule 612 may be referred to as a director of the LC molecule 612 or an LC director. An orientation of the LC director may determine a local optic axis orientation or an orientation of the optic axis at a local point of the optical film 600. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal. For illustrative purposes, the LC directors of the LC molecules 612 shown in FIGS. 6B and 6C are presumed to be within a film plane of the birefringent medium layer 615 with substantially small tilt angles with respect to the surface.

FIG. 6B schematically illustrates an x-y sectional view of a portion of the optical film 600, showing a radially varying in-plane orientation pattern of the LC directors of the LC molecules 612 located in a film plane of the optical film 600 shown in FIG. 6A. FIG. 6C illustrates a section of the in-plane orientation pattern taken along an x-axis in the optical film 600 shown in FIG. 6B, according to an embodiment of the present disclosure. In the film plane of the birefringent medium layer 615 of the optical film 600, the orientations of the optic axis of the optical film 600 may exhibit a continuous rotation in at least two opposite in-plane directions from a center of the optical film 600 to opposite peripheries of the optical film 600 with a varying pitch. In some embodiments, the in-plane orientation pattern of the orientations of the LC directors shown in FIG. 6B may also be referred to as a lens pattern. Accordingly, the optical film 600 with the LC director orientations shown in FIG. 6B may function as a polarization selective diffractive lens, e.g., a PBP lens, or a PVH lens, etc.

As shown in FIG. 6B, the orientations of the LC molecules 612 located in the film plane of the birefringent medium layer 615 may be configured with an in-plane orientation pattern having a varying pitch in at least two opposite in-plane directions from a lens center 650 to opposite lens peripheries 655. For example, the orientations of the LC directors of LC molecules 612 located in the film plane of the birefringent medium layer 615 may exhibit a continuous rotation in at least two opposite in-plane directions (e.g., a plurality of opposite radial directions) from the lens center 650 to the opposite lens peripheries 655 with a varying pitch. The orientations of the LC directors from the lens center 650 to the opposite lens peripheries 655 may exhibit a rotation in the same rotation direction (e.g., clockwise, or counter-clockwise). A pitch $\Lambda$ of the in-plane orientation pattern may be defined as a distance in the in-plane direction (e.g., a radial direction) over which the orientations of the LC directors (or azimuthal angles $\phi$ of the LC molecules 612) change by a predetermined angle (e.g., 180°) from a predetermined initial state.

As shown in FIG. 6C, according to the LC director field along the x-axis direction, the pitch $\Lambda$ may be a function of the distance from the lens center 650. The pitch $\Lambda$ may monotonically decrease from the lens center 650 to the lens peripheries 655 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the lens pattern, which may be the largest. The pitch $\Lambda_r$ is the pitch at a periphery region (e.g., periphery 655) of the lens pattern, which may be the smallest. In some embodiments, the azimuthal angle $\phi$ of the LC molecule 612 may change in proportional to the distance from the lens center 650 to a local point of the optical film 600 at which the LC molecule 612 is located.

For illustrative purposes, FIGS. 6B and 6C show an in-plane orientation pattern of the LC directors when the optical film 600 is a PBP or PVH lens functioning as an on-axis spherical lens. In some embodiments, the optical film 600 may be a PBP or PVH lens functioning as an off-axis spherical lens, a cylindrical lens, an aspheric lens, or a freeform lens, etc.

In some embodiments, the present disclosure provides a system for measuring a satellite ghost efficiency of a diffractive lens is provided. The system includes a light source configured to output a first probing beam, and a beam tweaking assembly disposed between the light source and the diffractive lens, and configured to convert the first probing beam into a second probing beam that is a non-collimated beam. The diffractive lens diffracts the second probing beam into a plurality of diffracted beams including a first diffracted beam of a parent diffraction order and a second diffracted beam of a satellite ghost diffraction order. The beam tweaking assembly includes one or more optical lenses, and an optical power of the beam tweaking assembly is adjustable. The system also includes a detector configured to generate a beam spot pattern including a first beam spot corresponding to the first diffracted beam and a second beam spot corresponding to the second diffracted beam.

In some embodiments, the first probing beam has a first beam diameter at a light input surface of the beam tweaking assembly, the second probing beam has a second beam diameter at a light output surface of the beam tweaking assembly, and the first beam diameter is greater than the second beam diameter.

In some embodiments, the system further includes a controller configured to adjust the optical power of the beam tweaking assembly to thereby adjust a beam spot size of each of the first beam spot and the second beam spot and a separation distance between the first beam spot and the second beam spot, until the controller determines that the beam spot size of each of the first beam spot and the second beam spot is smaller than a first predetermined value, and the separation distance is greater than a second predetermined value.

In some embodiments, the controller is further configured to: analyze the beam spot pattern to determine whether the beam spot size of each of the first beam spot and the second beam spot is smaller than the first predetermined value, and the separation distance between the first beam spot and the second beam spot is greater than the second predetermined value; and based on a determination that the beam spot size of at least one of the first beam spot or the second beam spot is greater than or equal to the first predetermined value, or the separation distance is smaller than or equal to the second predetermined value, adjust the optical power of the beam tweaking assembly provided to the first probing beam until the beam spot size of each of the first beam spot and the second beam spot is smaller than the first predetermined value and the separation distance is greater than the second predetermined value.

In some embodiments, the controller is further configured to: determine an optical power of the second diffracted beam and an optical power of the second probing beam when the beam spot size of each of the first and second beam spots is smaller than the first predetermined value, and the separation distance is greater than the second predetermined value; and determine the satellite ghost efficiency based on the optical power of the second diffracted beam and the optical power of the second probing beam.

In some embodiments, the first predetermined value and the second predetermined value are equal to a size of an active light receiving area of a detection unit in the detector.

In some embodiments, the satellite ghost diffraction order corresponding to the second diffracted beam is a first satellite ghost diffraction order. In some embodiments, the plurality of diffracted beams also includes a third diffracted beam of a second satellite ghost diffraction order. In some embodiments, the beam spot pattern also includes a third beam spot corresponding to the third diffracted beam. In some embodiments, the system also includes a controller configured to adjust the optical power of the beam tweaking assembly to thereby adjust a beam spot size of each of the first beam spot, the second beam spot, and the third beam spot, a first separation distance between the first beam spot and the second beam spot, and a second separation distance between the second beam spot and the third beam spot, until the beam spot size of each of the first beam spot, the second beam spot, and the third beam spot is smaller than a first predetermined value, the first separation distance and the second separation distance are greater than a second predetermined value.

In some embodiments, the one or more optical lenses included in the beam tweaking assembly include two optical lenses, and a distance between the two optical lenses is adjustable. In some embodiments, at least one of the one or more optical lenses included in the beam tweaking assembly has an adjustable optical power. In some embodiments, the beam tweaking assembly includes a spatial filter, a singlet lens, and a reversed beam expander arranged in an optical series, and the singlet lens is disposed between the spatial filter and the reversed beam expander.

In some embodiments, the present disclosure provides a method for measuring a satellite ghost efficiency of a diffractive lens. The method includes outputting, by a light source, a first probing beam to a beam tweaking assembly disposed between the light source and the diffractive lens, the beam tweaking assembly including one or more optical lenses, and an optical power of the beam tweaking assembly being adjustable. The method also includes converting, by the beam tweaking assembly, the first probing beam into a second probing beam propagating toward the diffractive lens, the second probing beam being a non-collimated beam, the diffractive lens diffracting the second probing beam into a plurality of diffracted beams including a first diffracted beam of a parent diffraction order and a second diffracted beam of a satellite ghost diffraction order. The method also includes generating, by a detector, a beam spot pattern including a first beam spot corresponding to the first diffracted beam and a second beam spot corresponding to the second diffracted beam. In some embodiments, the first probing beam has a first beam diameter at a light input surface of the beam tweaking assembly, the second probing beam has a second beam diameter at a light output surface of the beam tweaking assembly, and the first beam diameter is greater than the second beam diameter.

In some embodiments, the method also includes controlling, by a controller, the optical power of the beam tweaking assembly to adjust a beam spot size of each of the first beam spot and the second beam spot and a separation distance between the first beam spot and the second beam spot, until the beam spot size of each of the first beam spot and the second beam spot is smaller than a first predetermined value, and the separation distance is greater than a second predetermined value.

In some embodiments, controlling, by the controller, the optical power of the beam tweaking assembly to adjust the beam spot size of each of the first beam spot and the second beam spot and the separation distance between the first beam spot and the second beam spot until the beam spot size of each of the first beam spot and the second beam spot is smaller than the first predetermined value, and the separation distance is greater than the second predetermined value includes: analyzing, by the controller, the beam spot pattern to determine whether the beam spot size of each of the first beam spot and the second beam spot is smaller than the first predetermined value, and the separation distance between the first beam spot and the second beam spot is greater than the second predetermined value; and based on a determination that the beam spot size of at least one of the first beam spot or the second beam spot is greater than or equal to the first predetermined value, or the separation distance is smaller than or equal to the second predetermined value, adjusting, by the controller, the optical power of the beam tweaking assembly provided to the first probing beam until the beam spot size of each of the first beam spot and the second beam spot is smaller than the first predetermined value and the separation distance is greater than the second predetermined value.

In some embodiments, the method further includes: determining, by the controller, an optical power of the second diffracted beam and an optical power of the second probing beam when the beam spot size of each of the first beam spot and the second beam spot is smaller than the first predetermined value, and the separation distance is greater than the second predetermined value; and determining, by the controller, the satellite ghost efficiency based on the optical power of the second diffracted beam and the optical power of the second probing beam.

In some embodiments, the first predetermined value and the second predetermined value are equal to a size of an active light receiving area of a detection unit in the detector.

In some embodiments, the one or more optical lenses included in the beam tweaking assembly include two optical lenses, wherein controlling, by the controller, the optical power of the beam tweaking assembly to adjust the beam spot size of each of the first beam spot and the second beam spot and the separation distance between the first beam spot and the second beam spot includes: adjusting, by the controller, a distance between the two optical lenses to change the optical power of the beam tweaking assembly.

In some embodiments, controlling, by the controller, the optical power of the beam tweaking assembly to adjust the beam spot size of each of the first beam spot and the second beam spot and the separation distance between the first beam spot and the second beam spot includes: adjusting, by the controller, an optical power of at least one of the one or more optical lenses included in the beam tweaking assembly.

In some embodiments, the beam spot pattern further includes a third beam spot corresponding to a third diffracted beam, and the method further includes: analyzing, by a controller, the beam spot pattern to determine whether beam spot sizes of the first beam spot, the second beam spot, and the third beam spot are smaller than a size of an active light receiving area of a detection unit of the detector, and separation distances between adjacent beam spots in the first beam spot, the second beam spot, and the third beam spot are greater than the size of the active light receiving area of the detection unit of the detector; based on a determination that at least one of the beam spot sizes is greater than or equal to the size of the active light receiving area of the detection unit of the detector, or at least one of the separation distances is smaller than or equal to the size of the active light receiving area of the detection unit of the detector, continuously adjusting, by the controller, the optical power of the beam tweaking assembly to reduce a beam diameter of the second probing beam until the controller determines that the beam spot sizes are smaller than the size of the active light receiving area of the detection unit of the detector, and the separation distances are greater than the size of the active light receiving area of the detection unit of the detector; and based on a determination that the beam spot sizes are smaller than the size of the active light receiving area of the detection unit of the detector, and the separation distances are greater than the size of the active light receiving area of the detection unit of the detector, obtaining, by the controller, a first optical power of one of the first diffracted beam, the second diffracted beam, and the third diffracted beam corresponding to a satellite ghost diffraction order, and a second optical power of the second probing beam, and calculating the satellite ghost efficiency of the diffractive lens by dividing the first optical power by the second optical power.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A system for measuring a satellite ghost efficiency of a diffractive lens, comprising:
   a light source configured to output a first probing beam;
   a beam tweaking assembly disposed between the light source and the diffractive lens, and configured to convert the first probing beam into a second probing beam that is a non-collimated beam, the diffractive lens diffracting the second probing beam into a plurality of diffracted beams including a first diffracted beam of a parent diffraction order and a second diffracted beam of a satellite ghost diffraction order, wherein the beam tweaking assembly includes one or more optical lenses, and an optical power of the beam tweaking assembly is adjustable; and
   a detector configured to generate a beam spot pattern including a first beam spot corresponding to the first diffracted beam and a second beam spot corresponding to the second diffracted beam.

2. The system of claim 1, wherein the first probing beam has a first beam diameter at a light input surface of the beam tweaking assembly, the second probing beam has a second beam diameter at a light output surface of the beam tweaking assembly, and the first beam diameter is greater than the second beam diameter.

3. The system of claim 1, further comprising:
   a controller configured to adjust the optical power of the beam tweaking assembly to thereby adjust a beam spot size of each of the first beam spot and the second beam spot and a separation distance between the first beam spot and the second beam spot, until the controller determines that the beam spot size of each of the first beam spot and the second beam spot is smaller than a first predetermined value, and the separation distance is greater than a second predetermined value.

4. The system of claim 3, wherein the controller is further configured to:
   analyze the beam spot pattern to determine whether the beam spot size of each of the first beam spot and the second beam spot is smaller than the first predetermined value, and the separation distance between the first beam spot and the second beam spot is greater than the second predetermined value; and
   based on a determination that the beam spot size of at least one of the first beam spot or the second beam spot is greater than or equal to the first predetermined value, or the separation distance is smaller than or equal to the second predetermined value, adjust the optical power of the beam tweaking assembly provided to the first probing beam until the beam spot size of each of the first beam spot and the second beam spot is smaller than the first predetermined value and the separation distance is greater than the second predetermined value.

5. The system of claim 3, wherein the controller is further configured to:
   determine an optical power of the second diffracted beam and an optical power of the second probing beam when the beam spot size of each of the first and second beam spots is smaller than the first predetermined value, and the separation distance is greater than the second predetermined value; and
   determine the satellite ghost efficiency based on the optical power of the second diffracted beam and the optical power of the second probing beam.

6. The system of claim 3, wherein the first predetermined value and the second predetermined value are equal to a size of an active light receiving area of a detection unit in the detector.

7. The system of claim 1, wherein
   the satellite ghost diffraction order corresponding to the second diffracted beam is a first satellite ghost diffraction order,
   the plurality of diffracted beams also includes a third diffracted beam of a second satellite ghost diffraction order, and
   the beam spot pattern also includes a third beam spot corresponding to the third diffracted beam.

8. The system of claim 7, further comprising:
   a controller configured to adjust the optical power of the beam tweaking assembly to thereby adjust a beam spot size of each of the first beam spot, the second beam spot, and the third beam spot, a first separation distance between the first beam spot and the second beam spot, and a second separation distance between the second beam spot and the third beam spot, until the beam spot size of each of the first beam spot, the second beam spot, and the third beam spot is smaller than a first predetermined value, the first separation distance and the second separation distance are greater than a second predetermined value.

9. The system of claim 1, wherein the one or more optical lenses included in the beam tweaking assembly include a first optical lens and a second optical lens, and a distance between the first optical lens and the second optical lens is adjustable.

10. The system of claim 1, wherein at least one of the one or more optical lenses included in the beam tweaking assembly has an adjustable optical power.

11. The system of claim 1, wherein the beam tweaking assembly includes a spatial filter, a singlet lens, and a reversed beam expander arranged in an optical series, and the singlet lens is disposed between the spatial filter and the reversed beam expander.

12. A method for measuring a satellite ghost efficiency of a diffractive lens, comprising:
   outputting, by a light source, a first probing beam to a beam tweaking assembly disposed between the light source and the diffractive lens, the beam tweaking assembly including one or more optical lenses, and an optical power of the beam tweaking assembly being adjustable;
   converting, by the beam tweaking assembly, the first probing beam into a second probing beam propagating toward the diffractive lens, the second probing beam being a non-collimated beam, the diffractive lens diffracting the second probing beam into a plurality of diffracted beams including a first diffracted beam of a parent diffraction order and a second diffracted beam of a satellite ghost diffraction order; and
   generating, by a detector, a beam spot pattern including a first beam spot corresponding to the first diffracted beam and a second beam spot corresponding to the second diffracted beam.

13. The method of claim 12, wherein the first probing beam has a first beam diameter at a light input surface of the beam tweaking assembly, the second probing beam has a second beam diameter at a light output surface of the beam tweaking assembly, and the first beam diameter is greater than the second beam diameter.

14. The method of claim 12, further comprising:
controlling, by a controller, the optical power of the beam tweaking assembly to adjust a beam spot size of each of the first beam spot and the second beam spot and a separation distance between the first beam spot and the second beam spot, until the beam spot size of each of the first beam spot and the second beam spot is smaller than a first predetermined value, and the separation distance is greater than a second predetermined value.

15. The method of claim 14, wherein controlling, by the controller, the optical power of the beam tweaking assembly to adjust the beam spot size of each of the first beam spot and the second beam spot and the separation distance between the first beam spot and the second beam spot until the beam spot size of each of the first beam spot and the second beam spot is smaller than the first predetermined value, and the separation distance is greater than the second predetermined value comprises:
analyzing, by the controller, the beam spot pattern to determine whether the beam spot size of each of the first beam spot and the second beam spot is smaller than the first predetermined value, and the separation distance between the first beam spot and the second beam spot is greater than the second predetermined value; and
based on a determination that the beam spot size of at least one of the first beam spot or the second beam spot is greater than or equal to the first predetermined value, or the separation distance is smaller than or equal to the second predetermined value, adjusting, by the controller, the optical power of the beam tweaking assembly provided to the first probing beam until the beam spot size of each of the first beam spot and the second beam spot is smaller than the first predetermined value and the separation distance is greater than the second predetermined value.

16. The method of claim 14, further comprising:
determining, by the controller, an optical power of the second diffracted beam and an optical power of the second probing beam when the beam spot size of each of the first beam spot and the second beam spot is smaller than the first predetermined value, and the separation distance is greater than the second predetermined value; and
determining, by the controller, the satellite ghost efficiency based on the optical power of the second diffracted beam and the optical power of the second probing beam.

17. The method of claim 14, wherein the first predetermined value and the second predetermined value are equal to a size of an active light receiving area of a detection unit in the detector.

18. The method of claim 14, wherein the one or more optical lenses included in the beam tweaking assembly include a first optical lens and a second optical lens, and wherein controlling, by the controller, the optical power of the beam tweaking assembly to adjust the beam spot size of each of the first beam spot and the second beam spot and the separation distance between the first beam spot and the second beam spot comprises:
adjusting, by the controller, a distance between the first optical lens and the second optical lens to change the optical power of the beam tweaking assembly.

19. The method of claim 14, wherein controlling, by the controller, the optical power of the beam tweaking assembly to adjust the beam spot size of each of the first beam spot and the second beam spot and the separation distance between the first beam spot and the second beam spot comprises:
adjusting, by the controller, an optical power of at least one of the one or more optical lenses included in the beam tweaking assembly.

20. The method of claim 12, wherein the beam spot pattern further includes a third beam spot corresponding to a third diffracted beam, and the method further includes:
analyzing, by a controller, the beam spot pattern to determine whether beam spot sizes of the first beam spot, the second beam spot, and the third beam spot are smaller than a size of an active light receiving area of a detection unit of the detector, and separation distances between adjacent beam spots in the first beam spot, the second beam spot, and the third beam spot are greater than the size of the active light receiving area of the detection unit of the detector;
based on a determination that at least one of the beam spot sizes is greater than or equal to the size of the active light receiving area of the detection unit of the detector, or at least one of the separation distances is smaller than or equal to the size of the active light receiving area of the detection unit of the detector, continuously adjusting, by the controller, the optical power of the beam tweaking assembly to reduce a beam diameter of the second probing beam until the controller determines that the beam spot sizes are smaller than the size of the active light receiving area of the detection unit of the detector, and the separation distances are greater than the size of the active light receiving area of the detection unit of the detector; and
based on a determination that the beam spot sizes are smaller than the size of the active light receiving area of the detection unit of the detector, and the separation distances are greater than the size of the active light receiving area of the detection unit of the detector, obtaining, by the controller, a first optical power of one of the first diffracted beam, the second diffracted beam, and the third diffracted beam corresponding to a satellite ghost diffraction order, and a second optical power of the second probing beam, and calculating the satellite ghost efficiency of the diffractive lens by dividing the first optical power by the second optical power.

* * * * *